US012604334B2

(12) United States Patent
Zhang et al.

(10) Patent No.: US 12,604,334 B2
(45) Date of Patent: Apr. 14, 2026

(54) SIGNAL TRANSMISSION AND RECEPTION METHODS AND APPARATUS

(71) Applicant: 1FINITY Inc., Kawasaki (JP)

(72) Inventors: Lei Zhang, Beijing (CN); Guorong Li, Beijing (CN); Zhe Chen, Beijing (CN); Lei Song, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 630 days.

(21) Appl. No.: 17/590,079

(22) Filed: Feb. 1, 2022

(65) Prior Publication Data

US 2022/0159667 A1 May 19, 2022

Related U.S. Application Data

(63) Continuation of application No. PCT/CN2019/109227, filed on Sep. 29, 2019.

(30) Foreign Application Priority Data

Aug. 16, 2019 (WO) ................ PCT/CN2019/101219

(51) Int. Cl.
*H04W 72/56* (2023.01)
*H04W 72/0446* (2023.01)
(Continued)

(52) U.S. Cl.
CPC ....... *H04W 72/56* (2023.01); *H04W 72/0446* (2013.01); *H04W 72/0453* (2013.01); *H04W 72/23* (2023.01); *H04W 72/542* (2023.01)

(58) Field of Classification Search
CPC ... H04W 72/56; H04W 72/542; H04W 72/23; H04W 72/0446; H04W 72/0453
(Continued)

(56) References Cited

U.S. PATENT DOCUMENTS

| 2019/0159219 A1* | 5/2019 | Hosseini | ............... H04W 72/56 |
| 2019/0200375 A1* | 6/2019 | Yasukawa | ............. H04W 72/56 |

(Continued)

FOREIGN PATENT DOCUMENTS

| CN | 109155726 A | 1/2019 |
| CN | 109392126 A | 2/2019 |

(Continued)

OTHER PUBLICATIONS

First Notification of Office Action and Search Report issued by the China National Intellectual Property Administration for corresponding Chinese Patent Application No. 201980098338.6, dated May 28, 2023, with an English translation.

(Continued)

*Primary Examiner* — Hermon Asres
(74) *Attorney, Agent, or Firm* — Myers Wolin, LLC

(57) ABSTRACT

Signal transmission and reception methods and apparatuses. The method includes: determining by a terminal equipment that a time-frequency resource of a first uplink signal and a time-frequency resource of a second uplink signal at least partially overlap in a time domain or a time-frequency domain; comparing the first uplink signal and the second uplink signal, the comparing at least comprising comparing a first priority of the first uplink signal and a first priority of the second uplink signal, the first priority being related to content carried or indicated by an uplink signal; and transmitting the first uplink signal and/or the second uplink signal to a network device.

18 Claims, 4 Drawing Sheets

(51) Int. Cl.
   *H04W 72/0453*    (2023.01)
   *H04W 72/23*     (2023.01)
   *H04W 72/542*    (2023.01)
(58) Field of Classification Search
   USPC ........................................................ 370/329
   See application file for complete search history.

(56) References Cited

U.S. PATENT DOCUMENTS

| | | | |
|---|---|---|---|
| 2019/0254067 A1 | 8/2019 | Al-Imari et al. | |
| 2019/0254088 A1 | 8/2019 | Park et al. | |
| 2019/0327726 A1* | 10/2019 | Zhang | H04B 7/0632 |
| 2020/0146045 A1* | 5/2020 | Loehr | H04L 5/0048 |
| 2020/0178263 A1 | 6/2020 | Shao | |
| 2020/0403735 A1 | 12/2020 | Zhao | |

FOREIGN PATENT DOCUMENTS

| | | |
|---|---|---|
| CN | 110115086 A | 8/2019 |
| WO | 2018/030396 A1 | 2/2018 |
| WO | 2019/030431 A1 | 2/2019 |
| WO | 2019/076183 A1 | 4/2019 |
| WO | 2019/154127 A1 | 8/2019 |

OTHER PUBLICATIONS

Notice of Reasons for Refusal issued by the Japan Patent Office for corresponding Japanese Patent Application No. 2022-507916, mailed on Feb. 27, 2024, with an English translation.

Catt, "UL control enhancements for URLLC", Agenda Item: 7.2.6.2, 3GPP TSG-RAN WG1 Meeting #97, R1-1906328, Reno, USA, May 13-17, 2019.

Notice of Reasons for Refusal issued by the Japan Patent Office for corresponding Japanese Patent Application No. 2022-507916, mailed on Feb. 21, 2023, with an English translation.

Huawei et al., "Prioritization between configured and dynamic grants", Agenda Item: 11.7.3, 3GPP TSG-RAN WG2 Meeting #106, R2-1906505, Revision of R2-1903368, Reno, Untied States, May 13-17, 2019.

Interdigital, Inc. "On UCI enhancements for URLLC", Agenda Item: 7.2.6.2, 3GPP TSG-RAN WG1 Meeting #96bis, R1-1904883, Xi'an, China, Apr. 8-12, 2019.

Decision of Refusal and Decision of Dismissal of Amendment issued by the Japan Patent Office for corresponding Japanese Patent Application No. 2022-507916, mailed on Jun. 6, 2023, with an English translation.

International Search Report and Written Opinion of the International Searching Authority issued by the China National Intellectual Property Administration for corresponding International Patent Application No. PCT/CN2019/109227, dated May 20, 2020, with an English translation.

International Search Report and Written Opinion of the International Searching Authority issued by the China National Intellectual Property Administration for corresponding International Patent Application No. PCT/CN2019/101219, dated May 8, 2020, with a partial English translation.

Panasonic, "Discussion on UCI enhancement for URLLC", Agenda Item: 7.2.6.2, 3GPP TSG-RAN WG1 Meeting #97, R1-1906866, Reno, USA, May 13-17, 2019.

Panasonic, "Discussion on UCI enhancement for URLLC", Agenda Item: 7.2.6.2, 3GPP TSG-RAN WG1 Meeting #96bis, R1-1905092, Xi'an, China, Apr. 8-12, 2019.

Mediatek Inc., "Collision handling of PUCCH, PUSCH and SRS", Agenda Item: 7.1.3, 3GPP TSG-RAN WG1 Meeting #96-Bis, with CR DRAFT, current version: 15.5.0, R1-1904470, Xi'an, China, Apr. 8-12, 2019.

Decision of Refusal and Decision of Dismissal of Amendment issued by the Japan Patent Office for corresponding Japanese Patent Application No. 2024-074115 , mailed on Apr. 22, 2025, with an English translation.

Reconsideration Report by Examiner Before Appeal issued by the Japan Patent Office for corresponding Japanese Patent Application No. 2024-074115, mailed on Sep. 30, 2025, with an English translation.

* cited by examiner

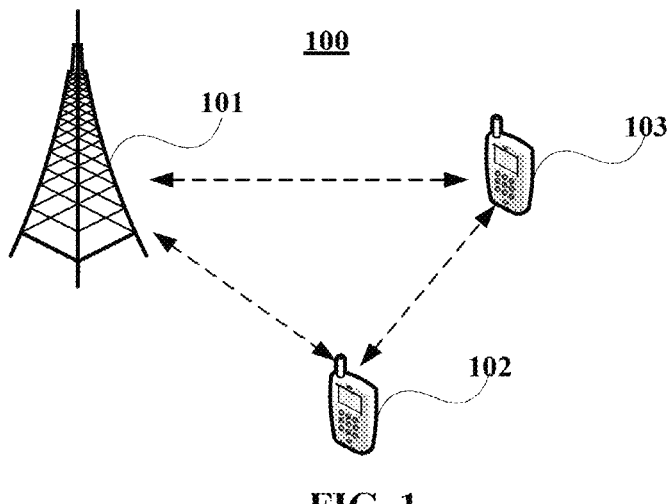

FIG. 1

201 determining by a terminal equipment that a time-frequency resource of a first uplink signal and a time-frequency resource of a second uplink signal at least partially overlap in a time domain or a time-frequency domain

202 comparing the first uplink signal and the second uplink signal by the terminal equipment, the comparison at least comprising comparing a first priority of the first uplink signal and a first priority of the second uplink signal, the first priority being related to content carried or indicated by an uplink signal

203 transmitting the first uplink signal and/or the second uplink signal by the terminal equipment to a network device

FIG. 2

301 transmitting configuration information or indication information by a network device to a terminal equipment, the configuration information or the indication information being at least used by the terminal equipment to determine a first priority of an uplink signal, the first priority being related to content carried or indicated by the uplink signal

302 receiving, by the network device, the uplink signal transmitted by the terminal equipment

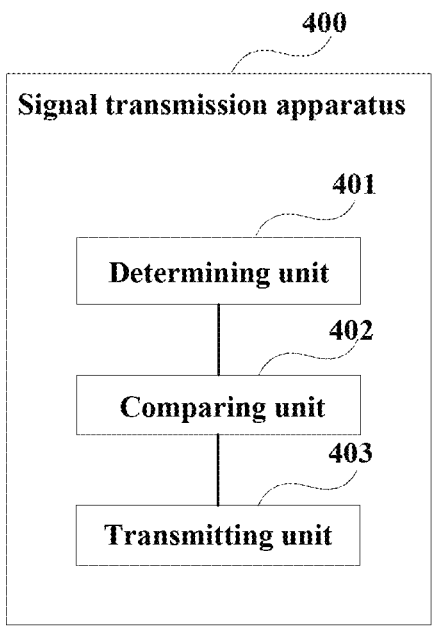

Signal transmission apparatus

401

Determining unit

402

Comparing unit

403

Transmitting unit

FIG. 4

SIGNAL TRANSMISSION AND RECEPTION METHODS AND APPARATUS

CROSS-REFERENCE TO RELATED APPLICATION

This application is a continuation application of International Application PCT/CN2019/109227 filed on Sep. 29, 2019, which claims priority to PCT/CN2019/101219, filed on Aug. 16, 2019, and designated the U.S., the entire contents of which are incorporated herein by reference.

TECHNICAL FIELD

This disclosure relates to the field of communication technologies.

BACKGROUND

In recent years, various data applications and services based on mobile communication networks have grown rapidly. In order to be adapted to such varying trends, future mobile communication networks need to provide more flexible and diverse services to meet demands of different terminal equipments and different services.

In addition to conventional enhanced mobile broadband (eMBB) services, fifth-generation (5G) mobile communication systems also support massive machine type communications (mMTC) services and ultra-reliable and low latency communications (URLLC) services.

It is a common example to support both URLLC services and eMBB services on a carrier. Since URLLC services require very high latency, if a signal related to an eMBB service is transmitted when a signal related to a URLLC service needs to be transmitted, in order to avoid overtime, it is often unable to wait for transmitting the signal related to the URLLC service after completion of transmission of the signal related to the eMBB service.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY OF THE DISCLOSURE

However, it was found by the inventors that in existing schemes, a physical layer is unable to distinguish a priority of a content (or service) carried or indicated by a signal (or channel), hence, the physical layer is unable to resolve a conflict between a signal carrying, for example, eMBB services, and a signal carrying, for example, URLLC services, and demands for transmission of signal in some scenarios cannot be satisfied.

In response to at least one of the above problems, embodiments of this disclosure provide signal transmission and reception methods and apparatuses.

According to an aspect of the embodiments of this disclosure, there is provided a signal transmission method, including:

determining that a time-frequency resource of a first uplink signal at least partially overlaps a time-frequency resource of a second uplink signal in a time domain or in a time-frequency domain;

comparing the first uplink signal with the second uplink signal, the comparison at least comprising comparison of a first priority of the first uplink signal with a first priority of the second uplink signal, the first priority being represented by one or more indices, the larger the index of the first priority, the higher the priority; and transmitting the first uplink signal to a network device, wherein the first priority of the first uplink signal is higher than the first priority of the second uplink signal; or transmitting the second uplink signal to the network device, wherein the first priority of the second uplink signal is higher than the first priority of the first uplink signal;

or, transmitting the first uplink signal and the second uplink signal to the network device after being multiplexed, wherein the first priority of the first uplink signal is identical to the first priority of the second uplink signal.

According to another aspect of the embodiments of this disclosure, there is provided a terminal equipment, comprising a memory and a processor, the memory storing a program, and the processor being configured to execute the program to implement the following operations:

determining that a time-frequency resource of a first uplink signal at least partially overlaps a time-frequency resource of a second uplink signal in a time domain or in a time-frequency domain;

comparing the first uplink signal with the second uplink signal, the comparison at least comprising comparison of a first priority of the first uplink signal with a first priority of the second uplink signal, the first priority being represented by one or more indices, the larger the index of the first priority, the higher the priority; and transmitting the first uplink signal to a network device, wherein the first priority of the first uplink signal is higher than the first priority of the second uplink signal; or transmitting the second uplink signal to the network device, wherein the first priority of the second uplink signal is higher than the first priority of the first uplink signal;

or, transmitting the first uplink signal and the second uplink signal to the network device after being multiplexed, wherein the first priority of the first uplink signal is identical to the first priority of the second uplink signal.

According to a further aspect of the embodiments of this disclosure, there is provided a signal reception method, including:

receiving a first uplink signal transmitted by a terminal equipment, wherein a first priority of the first uplink signal is higher than a first priority of a second uplink signal; or receiving the second uplink signal transmitted by the terminal equipment, wherein the first priority of the second uplink signal is higher than the first priority of the first uplink signal; or, receiving the first uplink signal and the second uplink signal transmitted by the terminal equipment after being multiplexed, wherein the first priority of the first uplink signal is identical to the first priority of the second uplink signal;

wherein a time-frequency resource of the first uplink signal at least partially overlaps a time-frequency resource of the second uplink signal in a time domain or in a time-frequency domain; the first priority being represented by one or more indices, the larger the index of the first priority, the higher the priority.

According to still another aspect of the embodiments of this disclosure, there is provided a network device, comprising a memory and a processor, the memory storing a program, and the processor being configured to execute the program to implement the following operations:

receiving a first uplink signal transmitted by a terminal equipment, wherein a first priority of the first uplink signal is higher than a first priority of a second uplink signal; or receiving the second uplink signal transmitted by the terminal equipment, wherein the first priority of the second uplink signal is higher than the first priority of the first uplink signal; or, receiving the first uplink signal and the second uplink signal transmitted by the terminal equipment after being multiplexed, wherein the first priority of the first uplink signal is identical to the first priority of the second uplink signal;

wherein a time-frequency resource of the first uplink signal at least partially overlaps a time-frequency resource of the second uplink signal in a time domain or in a time-frequency domain; the first priority being represented by one or more indices, the larger the index of the first priority, the higher the priority.

According to yet another aspect of the embodiments of this disclosure, there is provided a communication system, including:

a terminal equipment, configured to determine that a time-frequency resource of a first uplink signal at least partially overlaps a time-frequency resource of a second uplink signal in a time domain or in a time-frequency domain; compare the first uplink signal with the second uplink signal, the comparison at least comprising comparison of a first priority of the first uplink signal with a first priority of the second uplink signal, the first priority being represented by one or more indices, the larger the index of the first priority, the higher the priority; and transmit the first uplink signal to a network device, wherein the first priority of the first uplink signal is higher than the first priority of the second uplink signal; or transmit the second uplink signal to the network device, wherein the first priority of the second uplink signal is higher than the first priority of the first uplink signal; or, transmit the first uplink signal and the second uplink signal to the network device after being multiplexed, wherein the first priority of the first uplink signal is identical to the first priority of the second uplink signal;

a network device, configured to receive a first uplink signal transmitted by the terminal equipment, wherein a first priority of the first uplink signal is higher than a first priority of a second uplink signal; or receive the second uplink signal transmitted by the terminal equipment, wherein the first priority of the second uplink signal is higher than the first priority of the first uplink signal; or receive the first uplink signal and the second uplink signal transmitted by the terminal equipment after being multiplexed, wherein the first priority of the first uplink signal is identical to the first priority of the second uplink signal.

An advantage of the embodiments of this disclosure exists in that the signal has a first priority in the physical layer, the first priority corresponding to the content carried or indicated by the signal. Hence, the physical layer is able to distinguish the priority of the content carried or indicated by the signal, thereby resolving conflicts between signals carrying or indicating services of different priorities.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

FIG. 1 is schematic diagram of a communication system of an embodiment of this disclosure;

FIG. 2 is a schematic diagram of the signal transmission method of an embodiment of this disclosure;

FIG. 3 is a schematic diagram of the signal reception method of an embodiment of this disclosure;

FIG. 4 is a schematic diagram of the signal transmission apparatus of an embodiment of this disclosure;

and

Figure 7:
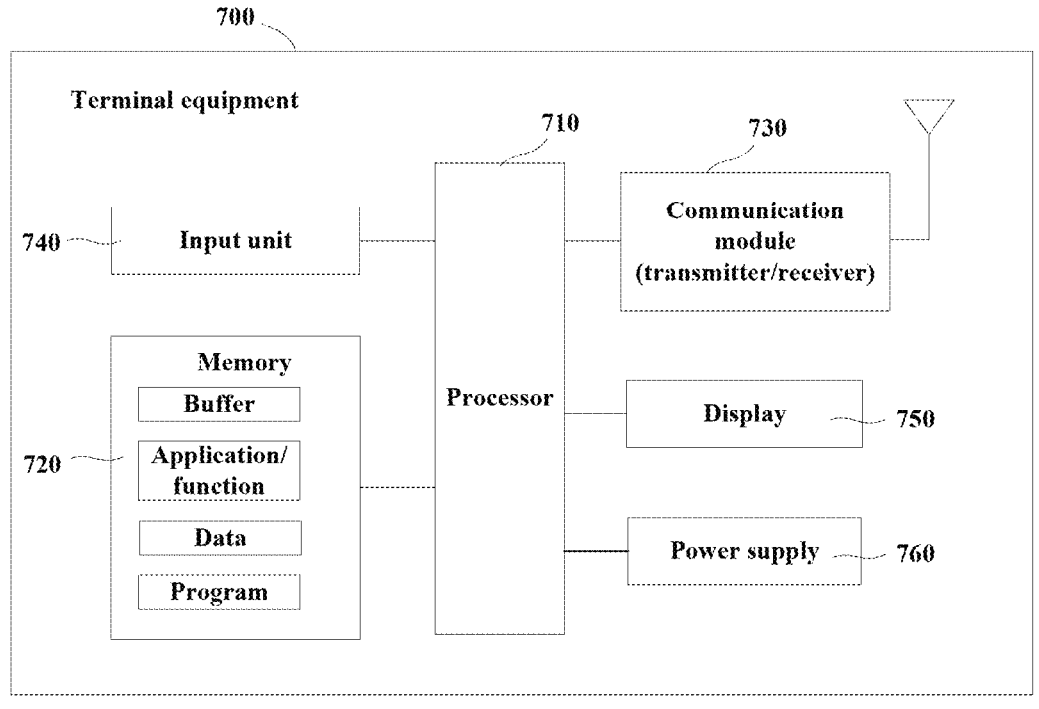

FIG. 7 is a schematic diagram of the terminal equipment of an embodiment of this disclosure.

DETAILED DESCRIPTION OF THE DISCLOSURE

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term. In the embodiments of this disclosure, the term "user equipment (UE)" or "terminal equipment (TE) or terminal device" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc. The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples; however, this disclosure is not limited thereto.

FIG. 1 is a schematic diagram of a communication system of an embodiment of this disclosure, in which a case where terminal equipments and a network device are taken as examples is schematically shown. As shown in FIG. 1, the communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiment of this disclosure, existing services or services that may be implemented in the future may be performed between the network device 101 and the terminal equipments 102, 103. For example, such services may include but not limited to an enhanced mobile broadband (eMBB), massive machine type communication (mMTC), and ultra-reliable and low-latency communication (URLLC), etc.

In the following description, without causing confusion, the terms "uplink control signal" and "uplink control information (UCI)" or "physical uplink control channel (PUCCH)" may be interchangeable, and the terms "uplink data signal" and "uplink data information" or "physical uplink shared channel (PUSCH)" may be interchangeable.

The terms "downlink control signal" and "downlink control information (DCI)" or "physical downlink control channel (PDCCH)" may be interchangeable, and the terms "downlink data signal" and "downlink data information" or "physical downlink shared channel (PDSCH)" may be interchangeable.

In addition, transmitting or receiving a PUSCH may also be understood as transmitting or receiving uplink data carried by the PUSCH, and transmitting or receiving a PUCCH may also be understood as transmitting or receiving uplink information carried by the PUCCH; an uplink signal may include an uplink data signal and/or an uplink control signal and/or an uplink reference signal, etc., and may also be referred to as uplink transmission or an uplink channel; and a content carried or indicated by a signal or channel may also be referred to as a service.

Embodiments of a First Aspect

The embodiments of this disclosure provide a signal transmission method, which shall be described from a terminal equipment side. FIG. 2 is a schematic diagram of the signal transmission method of the embodiment of this disclosure. As shown in FIG. 2, the method includes:

201: determining by a terminal equipment that a time-frequency resource of a first uplink signal and a time-frequency resource of a second uplink signal at least partially overlap in a time domain or a time-frequency domain;

202: comparing the first uplink signal and the second uplink signal by the terminal equipment, the comparison at least comprising comparing a first priority of the first uplink signal and a first priority of the second uplink signal, the first priority being related to content carried or indicated by an uplink signal (or it may also be regarded as that the first priority is corresponding to content carried or indicated by the uplink signal); and 203: transmitting the first uplink signal and/or the second uplink signal by the terminal equipment to a network device.

It should be noted that FIG. 2 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 2.

In some embodiments, the terminal equipment determines that the time-frequency resource where the first uplink signal is located and the time-frequency resource where the second uplink signal is located at least partially overlap in the time domain or the time-frequency domain, or in other words, the terminal equipment determines that there exists a conflict between transmission of the first uplink signal and transmission of the second uplink signal. In order to resolve this conflict, the terminal equipment compares the first uplink signal with the second uplink signal; in other words, comparing the first uplink signal with the second uplink signal by the terminal equipment is relatively helpful to resolving this conflict. The comparison at least includes comparison of a first priority of the first uplink signal and a first priority of the second uplink signal.

For example, the first priority may be predefined in a standard, so that signaling exchange between the network device and the terminal equipment may be reduced and signaling overhead may be saved, thereby reducing implementation logic complexity and lowering hardware overhead. The first priority may also be indicated by the network device to the terminal equipment, which may increase flexibility and facilitate expansion of existing mechanisms to support emerging services. The first priority may also be indicated by an upper layer of the terminal equipment to a physical layer, which may reduce workloads of standardization, speed up implementations of standards, shorten update cycles of actual terminal equipments and network devices, and better support product changes to be adapted to market changes, and promote sound development of related industries.

In some embodiments, the first priority is related to the content (or service) carried or indicated by the uplink signal, or the first priority is related to the priority of higher layer data carried by the uplink signal, or, the first priority is related to a priority of a corresponding logical channel of higher layer data carried by the uplink signal. The first priority includes at least one priority level or priority index to which the content (or service) carried or indicated by the uplink signal (including the first uplink signal and/or the second uplink signal) corresponds. The first priority may also not be expressed as a specific level or index, but is only distinguished by a higher priority or a lower priority, or is distinguished by a relative priority order between signals. For example, the first priority may be expressed as at least one priority level (or priority index), the priority level being predefined in a standard. For example, 8 priority indices (0 to 7, or, 1 to 8) are predefined first, a first priority of a certain uplink signal (such as carrying a type of eMBB services) is 2, and a first priority of another uplink signal (such as carrying a type of URLLC services) is 6. For another example, the number of first priorities may be 16, or may also be 2, 4, 6, 12, etc.

A correspondence between the first priority indices and the priorities may be that the smaller the indices, the higher the priorities; or, a correspondence between the first priority indices and the priorities may be that the larger the indices, the higher the priorities. Following description shall be given by taking that the smaller the indices, the higher the priorities, as an example, unless otherwise specified; however, this disclosure is not limited thereto.

In some embodiments, the uplink signal includes at least one of the following signals or channels: a physical uplink shared channel (PUSCH), a scheduling request (SR), feedback information (ACK/NACK), a feedback information codebook (HARQ-ACK codebook), channel state information (CSI), a sounding reference signal (SRS), etc.; however, this disclosure is not limited thereto.

In some embodiments, a first priority of the feedback information (ACK/NACK) may be indicated by the network device, such as being indicated by DCI used for scheduling a downlink shared channel (PDSCH) corresponding to the feedback information (ACK/NACK). For example, the network device indicates it via a field included in the DCI, or via an RNTI related to the DCI, or via a search space or CORESET (a control resource set) related to the DCI, etc. In other words, the terminal equipment may determine/distinguish the first priority of the feedback information (ACK/NACK) via the field indication included in the DCI, the RNTI related to the DCI, or the search space or CORESET related to the DCI, etc.

The network device may also indicate the first priority of the feedback information (ACK/NACK) to the terminal equipment by combining two or more of the above indication methods. For example, the network device may simultaneously use the RNTI related to the DCI and the field included in the DCI to indicate the first priority of the feedback information (ACK/NACK) to the terminal equipment. The simultaneous use may be that two or more indication methods indicate the same information respectively, thereby increasing reliability of the indication and avoiding different understandings of the first priority by the terminal equipment and the network device due to a transmission error, which in turn causes errors in data or information exchange. The simultaneous use may also be that a combination of two or more methods indicates one piece of information, or different methods indicate information that is not completely identical, and the terminal equipment needs to combine two or more types of information to determine the first priority of the feedback information (ACK/NACK).

In some embodiments, the first priority of the feedback information (ACK/NACK) may also be determined according to the priority of the corresponding PDSCH.

For example, the first priority of the feedback information (ACK/NACK) is identical (or equivalent) to the priority of the corresponding PDSCH, hence, the first priority of the feedback information (ACK/NACK) may be obtained via relevant information of the PDSCH, and keeping the priorities of two consistent is helpful to reducing complexity of standard protocols, so that standard implementations in a product design process are more easier.

For another example, the first priority of the feedback information (ACK/NACK) is different from the priority of the corresponding PDSCH, thereby providing a more flexible first priority, so that first priority is used more accurately in applications related to a forward link (a link transmitting a PDSCH) and a feedback link (a link transmitting feedback information).

In some embodiments, the first priority of the feedback information (ACK/NACK) may also be determined according to priorities of higher layer logical channels carried by the corresponding PDSCH.

For example, the first priority of the feedback information (ACK/NACK) is determined according to a priority of a logical channel with a highest priority in the higher layer logical channels carried by the PDSCH, thereby facilitating better protection for transmission of high-priority data.

For another example, the first priority of the feedback information (ACK/NACK) is determined according to a priority of a logical channel with a lowest priority in the higher layer logical channels carried by the PDSCH, thereby reducing waste of resources resulted from that low-priority data are transmitted according to requirements on high-priority data. In some embodiments, the feedback information codebook (HARQ-ACK codebook) may include at least one piece of feedback information (ACK/NACK), or, in other words, the feedback information codebook corresponds to at least one PDSCH.

In some embodiments, the first priority of the feedback information codebook is indicated by the DCI (or is determined according to the DCI). The above method for indicating the first priority of feedback information (ACK/NACK) may also be used by the network device to indicate the first priority of the feedback information codebook to the terminal equipment, which shall not be described herein any further. The feedback information codebook may also correspond to at least one piece of DCI, and the at least one piece of DCI may be used to schedule a PDSCH corresponding to the feedback information codebook. The PDSCH to which the feedback information codebook corresponds may be a PDSCH that the feedback codebook contains ACK/NACK feedback information used to feed back to the network device whether the PDSCH is correctly received.

For example, the first priority of the feedback information codebook may be indicated by one piece of DCI in at least one piece of corresponding DCI, and the one piece of DCI is the first or last one in the at least one piece of corresponding DCI, or is one predefined in a communication standard, or one designated or configured or indicated by the network device to the terminal equipment.

For another example, the first priority of the feedback information codebook is indicated by more than one pieces of DCI in at least one piece of corresponding DCI, and the first priority is indicated by the last DCI in the more than one pieces of DCI in the time domain, or, in other words, the first priority is indicated by one piece of DCI, and if there is another piece of DCI thereafter, the first priority may be overwritten or covered or rewritten by the other DCI; or, the first priority is indicated by the foremost DCI in the more than one pieces of DCI in the time domain, or, once the first priority is indicated by one piece of DCI, the terminal equipment ignores an indication of a subsequent piece of DCI; or, the first priority is determined according to a highest priority of the more than one pieces of DCI; or, the first priority is determined according to a lowest priority of the more than one pieces of DCI, and so on.

In some embodiments, the first priority of the feedback information codebook (HARQ-ACK codebook) is determined according to a highest priority in first priorities to which at least one piece of feedback information (ACK/NACK) contained therein corresponds, or according to a lowest priority in first priorities to which at least one piece of feedback information (ACK/NACK) contained therein corresponds, or according to a first priory to which one piece of feedback information (ACK/NACK) configured or indicated by the network device in the at least one piece of feedback information (ACK/NACK) contained therein corresponds. For example, the first priority of the feedback information codebook is equal to the highest or the lowest priority in first priorities to which at least two pieces of feedback information (ACK/NACK) contained therein correspond.

In some embodiments, the priority of the physical downlink shared channel (PDSCH) is indicated by the network device via the downlink control information (DCI) scheduling the PDSCH, or is determined according to a priority of an MAC PDU carried by the PDSCH, or is determined according to priorities of logical channels to which data on an MAC PDU carried by the PDSCH correspond, for example, it is determined according to the highest priority or the lowest priority of the logical channels to which the data correspond.

When the priority of the PDSCH is indicated by the network device via the downlink control information (DCI) scheduling the PDSCH, the above method for indicating the first priority of the feedback information (ACK/NACK) may also be used by the network device to indicate the priority of the PDSCH to the terminal equipment, which shall not be described herein any further.

In some embodiments, if the PDSCH is a semi-persistently scheduled (SPS) PDSCH, the priority of the PDSCH may be indicated by downlink control information (DCI) activating the SPS, or may also be indicated by higher layer signaling used for configuring the downlink SPS, etc. Correspondingly, a first priority of feedback information (ACK/NACK) or a feedback information codebook (HARQ-ACK codebook) related to the SPS PDSCH may be at least determined according to the priority of the SPS PDSCH.

In some embodiments, the priority of the SPS PDSCH may also be indicated by the DCI activating the SPS and/or by high-layer signaling configuring the downlink SPS. For example, a priority of a first PDSCH of the SPS is indicated by activating DCI, and an indication method is similar to the above PDSCH example, and will not be repeated herein any further. Priorities of PDSCHs other than the first PDSCH of the SPS are indicated by the higher layer signaling configuring the downlink SPS.

In some embodiments, by transmitting the feedback information (ACK/NACK) or feedback information codebook (HARQ-ACK codebook) to the network device, the terminal equipment will reflect whether DCI used for activating and/or releasing the SPS is correctly received, and will reflect whether DCI used for activating and/or releasing an uplink configured grant (CG) is correctly received in a similar method.

The first priority of the feedback information (ACK/NACK) or the feedback information codebook (HARQ-ACK codebook) related to the DCI used for activating and/or releasing may be predefined in a standard, for example, it is identical (or equivalent) or related to the priority of the SPS PDSCH or the uplink CG activated and/or released by it; or it may also be indicated by the network device to the terminal equipment via the DCI itself, such as being indicated via the field carried by the DCI or the RNTI related to the DCI or the search space or the CORESET related to the DCI, etc.; or it may also be indicated or configured by the network device via higher layer signaling; for example, the higher layer signaling used for indicating or configuring the first priority of the feedback information (ACK/NACK) or the feedback information codebook (HARQ-ACK codebook) is further used to configure the SPS PDSCH or the uplink CG activated and/or released by it.

In some embodiments, the terminal equipment determines the first priority of the feedback information (ACK/NACK) or feedback information codebook (HARQ-ACK codebook)

related thereto at least according to a priority of the DCI used for activating and/or releasing. The priority of the DCI used for activating and/or releasing may be predefined by in a standard, or may be indicated to the terminal equipment by the network device via the DCI itself, or may be indicated or configured by the network device via higher layer signaling. Specific implementation may be similar to determining the first priority of the feedback information (ACK/NACK) or the feedback information codebook (HARQ-ACK codebook) related to the DCI in the above embodiment, which shall not be repeated herein any further.

In some embodiments, the higher layer is relative to the physical layer, and may refer to a media access control (MAC) layer, or may refer to a radio resource control (RRC) layer. The higher layer signaling may be RRC signaling, or an MAC CE, etc.

In some embodiments, the first priority of the sounding reference signal (SRS) is indicated by the higher layer signaling configuring the SRS, or may also be indicated by the DCI scheduling the SRS, or may be pre-defined in a communication standard protocol. The three modes may be implemented separately or in combination.

For example, the communication standard only supports one of these modes. For another example, the communication standard supports at least two of these modes, and an indication of one mode may be overwritten or rewritten by an indication of the other mode. For example, the predefined indication may be overwritten by the higher layer signaling indication, or an indication of the higher layer signaling may be overwritten by the DCI indication, etc.

In some embodiments, the first priority of the channel state information (CSI) is indicated by higher layer signaling, such as higher layer signaling configuring CSI reporting, or it may be indicated by DCI scheduling CSI reporting, or it may be predefined in a communication standard protocol. The three modes may be implemented separately or in combination. For example, the communication standard only supports one of these modes. For another example, the communication standard supports at least two of these modes, and an indication of one mode may be overwritten or rewritten by an indication of the other mode. The predefined indication may be overwritten by the higher layer signaling indication, and/or, an indication of the higher layer signaling may be overwritten by the DCI indication, etc.

In some embodiments, the first priority of the channel state information (CSI) is indicated by the downlink control information (DCI) scheduling the CSI, for example, the channel state information (CSI) is aperiodic CSI, etc.; or the first priority of the channel state information (CSI) is configured by higher layer signaling (such as RRC signaling) configuring the periodic CSI, for example, the channel state information (CSI) is periodic CSI, etc.

In some embodiments, the first priority of the physical uplink shared channel (PUSCH) is indicated by an MAC layer to the physical layer, or is determined according to auxiliary information provided by the MAC layer, or indicated by the DCI scheduling the PUSCH or determined according to the DCI.

For example, the auxiliary information provided by the MAC layer may be a logical channel priority corresponding to the MAC PDU corresponding to the PUSCH, or it may be a highest priority or a lowest priority in logical channel priorities corresponding to the MAC PDU corresponding to the PUSCH, or, may be related to whether the PUSCH contains logical channel data, and so on.

For example, if it is a configured grant (CG) PUSCH, its first priority may be indicated by the physical layer signaling, such as being indicated by the downlink DCI activating the uplink configuration grant or being determined according to the DCI, or it may also be indicated by or configured by the higher layer signaling, such as the higher layer signaling configuring the uplink configuration grant. In another implementation, the first priority of the CG PUSCH may also be indicated or configured by the physical layer signaling and the higher layer signaling at the same time. For example, a priority of a first PUSCH after activating DCI is indicated by the activating DCI, and priorities of PUSCHs other than the first PUSCH are indicated or configured by the higher layer signaling.

In some embodiments, the first priority of the scheduling request (SR) is indicated by the MAC layer to the physical layer, or is determined according to auxiliary information provided by the MAC layer. For example, the auxiliary information provided by the MAC layer may be a priority of a logical channel triggering the SR, etc., or may be a highest priority or lowest priority in priorities of logical channels triggering the SR.

In some embodiments, the first priority of the scheduling request (SR) is configured or indicated by a higher layer. For example, a higher layer of the terminal equipment indicates the first priority of the SR via SR signaling, and the higher layer signaling is also used to indicate configuration related to SR transmission, such as indicating a resource (a PUCCH resource, etc.) carrying the SR, or indicating a parameter related to SR transmission, etc.

The first priority of the uplink signal is schematically described above, and how to implement at least comparison (which may also be referred to as sorting) between the first priority of the first uplink signal and the first priority of the second uplink signal shall be schematically described below.

In some embodiments, the comparison between the first priority of the first uplink signal and the first priority of the second uplink signal may be direct comparison between the first priority of the first uplink signal and the first priority of the second signal, and may also be comparison taking the first priorities into account (such as combining the first priorities with type-based comparison described later).

In some embodiments, the terminal equipment compares at least two uplink signals according to first priorities of the at least two uplink signals; and when the first priorities of the at least two uplink signals are identical, it compares according to types of the at least two uplink signals (for example, whether they are SRS signals) or types of contents carried by the uplink signals (for example, whether data, an SR, ACK/NACK, or CSI, etc., are carried). For the sake of simplicity, the comparison performed based on the types of the uplink signals or the types of the carried contents is hereinafter referred to as type-based comparison.

For example, if there exists a conflict between transmissions of uplink signal 1 and uplink signal 2, if a first priority of uplink signal 1 is 8, and a first priority of uplink signal 2 is 6, a result of comparison between the priorities of the two signals is: uplink signal 1<uplink signal 2.

For another example, there exists a conflict between transmissions of uplink signal 1 and uplink signal 2, and if a first priority of uplink signal 1 is 6, and a first priority of uplink signal 2 is also 6, comparison is performed according to types of the two uplink signals or types of contents carried thereby (for example, whether data, an SR, ACK/NACK, or CSI, etc., are carried, and for another example, whether it is an SRS signal, etc.). For example, uplink signal 1 carries an SR and uplink signal 2 carries CSI, and a result of comparison between the priorities of the two signals is: uplink signal 1>uplink signal 2.

For a further example, there exist conflicts between transmissions of uplink signal 1, uplink signal 2 and uplink signal 3. If a first priority of uplink signal 1 is 6, a first priority of uplink signal 2 is also 6, and a first priority of uplink signal 3 is 7, it may be determined that the priority of uplink signal 3 is lowest. Comparison between uplink signal 1 and the uplink signal 2 needs to be further performed, and comparison is performed according to types of the two uplink signals or types of contents carried thereby (for example, whether data, an SR, ACK/NACK, or CSI, etc., are carried, and for another example, whether it is an SRS signal, etc.). For example, uplink signal 1 carries an SR and uplink signal 2 carries CSI, and a result of comparison between the priorities of the two signals is: uplink signal 1>uplink signal 2. Hence, a result of comparison between the priorities of the three signals is: uplink signal 1>uplink signal 2>uplink signal 3.

In some embodiments, for different first priority levels (or indices), when comparison is performed according to types of at least two uplink signals or types of contents carried thereby, priority rules followed are at least partially different.

For example, the first priorities are divided into two levels, such as level 1a and level 1b. And according to comparison between types of signals or types of contents carried thereby, they are divided into at least including data (a PUSCH), ACK/NACK and SR. When the first priorities of the two signals are both of level 1a, an order of type-based comparison is PUSCH>SR>ACK/NACK; and when the first priorities of the two signals are both of level 1b, an order of type-based comparison is ACK/NACK>PUSCH>SR.

In some embodiments, first priority levels of the at least two uplink signals are divided into at least two sets, and type-based comparison is respectively performed on the at least two uplink signals according to the sets. For different first priority level sets, when comparison is performed according to types of the at least two uplink signals or types of contents carried thereby, priority rules followed are at least partially different.

In some embodiments, the first priorities are not directly compared, but are taken as factors for comparison.

For example, the first priorities include two levels, such as level 1a and level 1b. An order of compared priority level is: level 1a PUSCH>level 1a SR>level 1b SR>level 1b PUSCH>level 1a ACK/NACK>level 1b ACK/NACK. There exists a conflict between transmissions of uplink signal 1 and uplink signal 2, and priority comparison needs to be performed in conjunction with types of the first priorities of the uplink signals or types of contents carried thereby at the same time.

How to implement comparison including at least the first priority of the first uplink signal and the first priority of the second uplink signal is schematically described above, and how to process at least two uplink signals where transmission conflicts exist shall be described below.

In some embodiments, the terminal equipment transmits at least one of the at least two uplink signals according to comparison of the at least two uplink signals. For example, an uplink signal of a lower priority may be dropped or ongoing transmission of an uplink signal of a lower priority may be terminated, and an uplink signal of a higher priority may be transmitted; or, in a case where it is determined that a condition is satisfied, at least two uplink signals in which conflicts occurs are transmitted after being multiplexed together.

The satisfying a condition may be that a signal conforming to a provision in a standard may be multiplexed with another signal. For example, the SR may be multiplexed with the ACK/NACK and carried by the PUCCH and transmitted; for another example, the SR may be multiplexed with the PUSCH; for a further example, the ACK/NACK may be multiplexed with the PUSCH; and for still another example, the CSI may be multiplexed with the ACK/NACK, and so on.

For example, according to the comparison result, if the priority of the first uplink signal is higher, the terminal equipment may transmit the first uplink signal; or, if the priority of the second uplink signal is higher, the terminal equipment may transmit the second uplink signal; or, if the terminal equipment determines that the first uplink signal and the second uplink signal satisfy a multiplexing condition after the comparison, the terminal equipment may transmit the first uplink signal and the second uplink signal after multiplexing them together.

In some embodiments, whether a signal may be multiplexed with another signal is at least related to a priority of one of the two signals or a content carried or indicated thereby.

Following description shall be given by taking multiplexing the control information and the PUSCH together as an example. However, this disclosure is not limited thereto, and multiplexed signals/channels may all be control information/channels, or may all be data channels (such as PUSCHs), etc.; and one of the multiplexed signals/channels may also be a reference signal or the like. In addition, the number of multiplexed signals/channels may be greater than two.

In one implementation, a control signal of a higher priority or a control signal carrying/indicating a service/content (such as an SR or ACK/NACK feedback information or CSI, etc.) of a higher priority may be multiplexed with a PUSCH of a higher priority together. And a control signal of a lower priority or a control signal carrying/indicating a service/content of a lower priority may not be multiplexed with a PUSCH of a higher priority together.

For example, if the first priority of the control information is greater than or equal to (or greater than) the first priority of the PUSCH, the control information may be multiplexed with the PUSCH. For example, if the first priority of the SR is greater than or equal to (or greater than) the first priority of the PUSCH, the SR may be multiplexed with the PUSCH.

In another implementation, a control signal of a higher priority or a control signal carrying/indicating a service/content (such as an SR or ACK/NACK feedback information or CSI, etc.) of a higher priority may be multiplexed with a PUSCH. And a control signal of a lower priority or a control signal carrying/indicating a service/content of a lower priority may not be multiplexed with a PUSCH.

For example, if the first priority of the control information is greater than or equal to (or greater than) a threshold, the control information may be multiplexed with the PUSCH. The threshold may be predefined in a standard, or may be configured or indicated by the network device for the terminal equipment via higher layer signaling.

In a further implementation, whether the control information (such as an SR or ACK/NACK feedback information or CSI, etc.) may be multiplexed with the PUSCH is at least related to a type of the control information. Which control information may be multiplexed with a PUSCH of a higher priority is predefined in a standard or is indicated or configured by the network device via higher layer signaling for the terminal equipment. For example, it is predefined or indicated/configured for the terminal equipment that the SR may be multiplexed with a PUSCH of a higher priority, and the CSI may not be multiplexed with a PUSCH of a higher priority.

In still another implementation, whether the control information (such as an SR or ACK/NACK feedback information or CSI, etc.) may be multiplexed with a PUSCH is at least related to the number of bits contained in the control information, and/or is related to a first priority of PUSCH.

For example, if the SR contains information of less than or equal to m bits, the SR may be multiplexed with a PUSCH of a higher priority; and if the SR contains information of more than m bits, the SR may not be multiplexed with a PUSCH of a higher priority, for example, m=1 or m=2, etc. For another example, if the ACK/NACK contains information of less than n bits, the ACK/NACK may be multiplexed with a PUSCH of a higher priority; and if the ACK/NACK contains information of greater than n bits, the ACK/NACK may not be multiplexed with a PUSCH of a higher priority together, where, n is a natural number.

The above implementations of multiplexing the control information and the PUSCH may be implemented separately or in combination with each other. Different from existing techniques, the first priority of the PUSCH and/or the first priority of the control information and/or a content of the control information and/or the number of bits contained in the control information, etc., is/are taken into account in the process of determining whether the control information may be multiplexed with the PUSCH in the above implementations.

Using at least one of such implementations, on the one hand, it is helpful to reducing latency of signal transmission by multiplexing, and on the other hand, it is helpful to protect transmission reliability of signals of higher priorities.

For example, only control information with priorities greater than or equal to the first priority of the PUSCH may be multiplexed together, or only control information having a higher priority or carrying a more important content may be multiplexed with the PUSCH, which may ensure transmission of important control information while preventing reliability of a PUSCH of a higher priority from being damaged due to control information of a lower priority.

For another example, whether the control information may be multiplexed with the PUSCH of a higher priority is determined at least according to the number of bits contained in the control information, it could satisfy the demands of the control information for transmission as much as possible, without significant loss of transmission reliability of a PUSCH of a higher priority, and it could provide better flexibility for network operations and is helpful to improving overall network performance.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the signal has a first priority in the physical layer, the first priority is related to the content carried or indicated by the signal. Hence, the physical layer is able to distinguish the priority of the content carried or indicated by the signal, thereby resolving conflicts between signals carrying or indicating services of different priorities, and better supporting services having different demands for transmission.

Embodiments of a Second Aspect

The above embodiments of the first aspect schematically illustrate the physical layer of the terminal equipment, and the embodiments of the second aspect further illustrate the MAC layer. The embodiments of the second aspect may be combined with the embodiments of the first aspect, or may be implemented separately, and contents in the embodiments identical to those in the embodiments of the first aspect will not be repeated herein any further.

The embodiments of this disclosure further provide a data generation method, including: generating an MAC PDU by an MAC layer of a terminal equipment according to a grant; determining a second priority related to the MAC PDU by the MAC layer of the terminal equipment; storing the MAC PDU in a HARQ buffer, and instructing a physical layer of the terminal equipment to generate data transmission according to an uplink grant, by the MAC layer of the terminal equipment.

In some embodiments, the MAC layer of the terminal equipment indicates the second priority of the physical layer of the terminal equipment related to the MAC PDU.

In some embodiments, the protocol data unit (PDU) of the media access control (MAC) includes at least one MAC CE (control element) and/or data to which at least one logical channel corresponds, or the MAC PDU does not include an MAC CE or a logical channel.

In some embodiments, the second priority related to the MAC PDU is determined according to a priority of at least one logical channel to the data contained therein corresponds, and the MAC PDU includes or does not include the MAC CE.

For example, the second priority of the MAC PDU is determined according to a highest priority in priorities of at least one logical channel to which the data correspond, or the second priority of the MAC PDU is determined according to a lowest priority in priorities of at least one logical channel to which the data correspond.

In some embodiments, the second priority related to the MAC PDU is determined according to the MAC CE contained therein, and the MAC PDU contains or does not contain data from a logical channel.

For example, the MAC PDU contains an MAC CE, and no matter whether the MAC PDU contains or does not contain data, the second priority of the MAC PDU is the highest.

In some embodiments, the second priority related to the MAC PDU is determined according to the MAC CE contained therein and the priority of at least one logical channel to which the data contained therein correspond.

For example, the second priority related to the MAC PDU is determined according to the contained MAC CE and a highest priority of the logical channel corresponding to the data. Priorities between the MAC CE and the logical channel are as follows, which are listed from top to bottom, and the priority levels are from high to low.

C-RNTI MAC CE or data from UL-CCCH;

Configured Grant Confirmation MAC CE;

MAC CE for BSR, with exception of BSR included for padding;

Single Entry PHR MAC CE or Multiple Entry PHR MAC CE;

Data from any logical channel except a UL-CCCH;

MAC CE for Recommended bit rate query;

MAC CE for BSR included for padding.

In some embodiments, the second priority related to the MAC PDU is determined according to that it contains neither an MAC CE nor data from a logical channel.

For example, MAC PDU is used to transmit an aperiodic CSI report by the physical layer, in which only padding bits are contained. The priority of the MAC PDU may be set to be of a lowest priority, or of a predefined priority, or of a pre-configured priority, or of a default priority, etc.

In some embodiments, the MAC layer may indicate the second priority of the MAC PDU to the physical layer, and the physical layer determines the first priority of the PUSCH according to the second priority; or the MAC layer may provide auxiliary information to the physical layer, and the physical layer determines the first priority of the PUSCH according to the auxiliary information, the auxiliary information being related to the second priority of the MAC PDU to which the PUSCH corresponds. The second priority of the MAC PDU and the first priority of the PUSCH corresponding thereto may be identical or different. Reference may be made to related contents described in the embodiments of the first aspect for the first priority.

For example, a total number of first priority levels of the PUSCH may be less than a total number of second priority levels of the MAC PDU. A granularity of the physical layer priority is greater than a granularity of the higher layer priority, which is helpful to reducing overhead of physical layer control information.

For another example, the total number of the first priority levels of the PUSCH may be equal to the total number of second priority levels of the MAC PDU. Keeping the two consistent is helpful to reducing complexity of a standard protocol, making it easier to implement the standard in a product design process.

The embodiment of this disclosure further provides a scheduling request generation method, including: triggering a scheduling request (SR) by an MAC layer of a terminal equipment; determining a third priority related to the SR by the MAC layer of the terminal equipment; and instructing a physical layer of the terminal equipment to signal the SR by the MAC layer of the terminal equipment.

In some embodiments, the MAC layer of the terminal equipment indicates a third priority of the physical layer of the terminal equipment related to the SR.

In some embodiments, the third priority related to the SR is a priority of a logical channel related to the SR. Reference may be made to the above embodiment for the priority of the logical channel.

In some embodiments, the SR is triggered by arrival of data on the logical channel related to the SR.

The embodiment of this disclosure further provides a scheduling request generation method, including: triggering a scheduling request (SR) by an MAC layer of a terminal equipment; instructing a physical layer of the terminal equipment to signal the SR by the MAC layer of the terminal equipment; and indicating a priority related to the SR to a physical layer of the terminal equipment by the MAC layer of the terminal equipment.

In some embodiments, the SR is triggered by arrival of data on a logical channel related to the SR, and the MAC layer of the terminal equipment indicates a priority of the logical channel of the physical layer of the terminal equipment.

In some embodiments, the SR is triggered by arrival of data on more than one logical channels related to the SR, and the MAC layer of the terminal equipment indicates a highest priority or lowest priority in priorities of the more than one logical channels of the physical layer of the terminal equipment.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

Embodiments of a Third Aspect

The embodiments of the third aspect further describe the SR. The embodiments of the third aspect may be combined with the embodiments of the first aspect and/or the second aspect, or may be implemented separately; and contents identical to those in the embodiments of the first aspect and/or the second aspect shall not be repeated herein any further.

In some embodiments, the first priority includes at least a first category (level) and a second category (level). The scheduling request (SR) in the first type (level) may be multiplexed with other signals, and the scheduling request (SR) in the second type (level) may not be multiplexed with other signals.

For example, the first priority may be divided into class 1 (such as including priority indices 5-7, corresponding to eMBB services) and class 2 (such as including priority indices 0-4, corresponding to URLLC services); and an SR with a first priority belonging to class 1 may not be multiplexed with other signals, and an SR with a first priority belonging to class 2 may be multiplexed with other signals.

In some embodiments, when the first priority of the scheduling request (SR) is greater than a preset threshold, the scheduling request (SR) is not multiplexed with other signals; and when the first priority of the scheduling request (SR) is less than or equal to the preset threshold, the scheduling request (SR) is multiplexed with other signals.

For example, the preset threshold is 4, and a scheduling request (SR) with a first priority less than 4 is deemed as corresponding to a service of a higher priority, such as a URLLC service, etc.; hence, the SR may be multiplexed with other signals; and a scheduling request (SR) with a first priority greater than or equal to 4 is deemed as corresponding to a service of a lower priority, such as an eMBB service, etc.; hence, the SR may not be multiplexed with other signals.

In some embodiments, when the first priority of the physical uplink shared channel (PUSCH) is greater than the preset threshold, a scheduling request (SR) of less than or equal to P bits (such as 1 bit) may be multiplexed with the physical uplink shared channel (PUSCH), and a scheduling request (SR) of greater than P bits may not be multiplexed with the physical uplink shared channel (PUSCH); where, P is a positive integer. A value of P is predefined in a standard, or is configured or indicated by the network device for the terminal equipment via signaling.

For example, if the first priority of the PUSCH is greater than the preset threshold (such as 4), the PUSCH is deemed as corresponding to a service of a higher priority, such as a URLLC service, etc. Therefore, in order to ensure a high requirement of a service of a higher priority for transmission, such as reliability, the number of bits of the multiplexed SR may not be large, thus, only an SR of 1 bit is allowed to be multiplexed with the PUSCH.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

Embodiments of a Fourth Aspect

The embodiments of this disclosure provide a signal reception method, which shall be described from a network device side. Contents in the embodiments identical to those in the embodiments of the first to third aspect shall not be described herein any further.

FIG. 3 is a schematic diagram of the signal reception method of the embodiment of this disclosure. As shown in FIG. 3, the method includes:

301: transmitting configuration information or indication information by a network device to a terminal equipment, the configuration information or the indication information being at least used by the terminal equipment to determine a first priority of an uplink signal, the first priority being related to content carried or indicated by the uplink signal; and

302: receiving, by the network device, the uplink signal transmitted by the terminal equipment.

In some embodiments, the first priority includes at least one priority level or priority index to which a content (or service) carried or indicated by the uplink signal corresponds.

In some embodiments, the configuration information or indication information may be higher layer signaling (such as RRC signaling), or may also be dynamic signaling, such as DCI.

In some embodiments, the uplink signal includes feedback information (ACK/NACK), a first priority of the feedback information (ACK/NACK) being indicated by the network device, or being determined according to a first priority of a physical downlink shared channel (PDSCH) to which the feedback information (ACK/NACK) corresponds.

In some embodiments, the uplink signal includes feedback information (ACK/NACK), a first priority of the feedback information (ACK/NACK) being indicated by the network device, or being determined according to a priority of a logical channel corresponding to data on an MAC PDU corresponding to a physical downlink shared channel (PDSCH) to which the feedback information (ACK/NACK) corresponds.

In some embodiments, the uplink signal includes a feedback information codebook (ACK/NACK codebook), a first priority of the feedback information codebook (ACK/NACK codebook) being indicated by the network device, or being determined according to a first priority of a physical downlink shared channel (PDSCH) to which the feedback information codebook (ACK/NACK codebook) corresponds.

In some embodiments, the uplink signal includes a feedback information codebook (ACK/NACK codebook), a first priority of the feedback information codebook (ACK/NACK codebook) being indicated by the network device, or being determined according to a priority of a logical channel corresponding to data on an MAC PDU corresponding to a physical downlink shared channel (PDSCH) to which the feedback information codebook (ACK/NACK codebook) corresponds.

In some embodiments, a priority of the physical downlink shared channel (PDSCH) is indicated by the network device by scheduling the downlink control information (DCI), or is indicated by activating downlink control information (DCI), or is configured via higher layer signaling.

In some embodiments, the first priority of the channel state information (CSI) is indicated by downlink control information (DCI) scheduling the CSI. For example, the channel state information (CSI) is aperiodic CSI, or, a first priority of the channel state information (CSI) is configured by the higher layer signaling (such as RRC signaling) configuring the aperiodic CSI, and for example, the channel state information (CSI) is periodic CSI.

In some embodiments, the uplink signal includes a physical uplink shared channel (PUSCH), a first priority of the physical uplink shared channel (PUSCH) being indicated by DCI scheduling the PUSCH or being configured by higher layer signaling.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the signal has a first priority in the physical layer, the first priority corresponds to the content carried or indicated by the signal. Hence, the physical layer is able to distinguish the priority of the content carried or indicated by the signal, thereby resolving conflicts between signals carrying or indicating services of different priorities.

Embodiments of a Fifth Aspect

The embodiments of this disclosure provide a signal transmission apparatus. The apparatus may be, for example, a terminal equipment, or may be one or more components or assemblies configured in a terminal equipment. Contents in the embodiments identical to those in the embodiments of the first to fourth aspects shall not be described herein any further.

FIG. 4 is a schematic diagram of the signal transmission apparatus of an embodiment of this disclosure. As shown in FIG. 4, the signal transmission apparatus 400 includes:

a determining unit 401 configured to determine that a time-frequency resource of a first uplink signal (or channel) at least partially overlaps a time-frequency resource of a second uplink signal (or channel) on a time domain or a time-frequency domain;

a comparing unit 402 configured to compare the first uplink signal and the second uplink signal, the comparison at least comprising comparing a first priority of the first uplink signal and a first priority of the second uplink signal, and the first priority being related to content (or service) carried or indicated by an uplink signal; and a transmitting unit 403 configured to transmit the first uplink signal and/or the second uplink signal to a network device.

It should be noted that the components or modules related to this disclosure are only described above. However, this disclosure is not limited thereto, and the signal transmission apparatus 400 may further include other components or modules, and reference may be made to related techniques for particulars of these components or modules.

Furthermore, for the sake of simplicity, connection relationships between the components or modules or signal profiles thereof are only illustrated in FIG. 4. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the signal has a first priority in the physical layer, the first priority corresponds to the content carried or indicated by the signal. Hence, the physical layer is able to distinguish the priority of the content carried or indicated by the signal, thereby resolving conflicts between signals carrying or indicating services of different priorities.

Embodiments of a Sixth Aspect

The embodiments of this disclosure provide a signal reception apparatus. The apparatus may be, for example, a network device, or may be one or more components or assemblies configured in a network device. Contents in the embodiments identical to those in the embodiments of the first to fifth aspects shall not be described herein any further.

Figure 5:
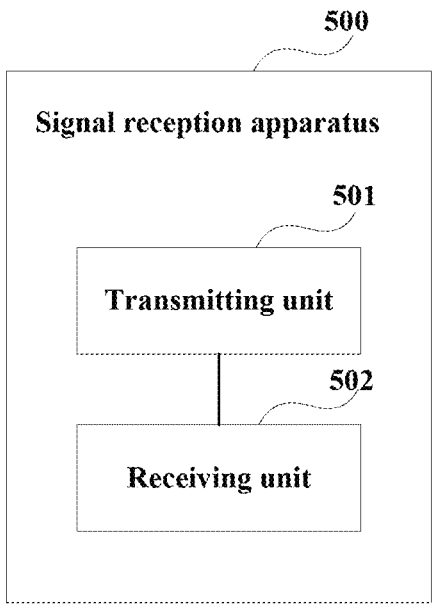
FIG. 5 is a schematic diagram of the signal reception apparatus of an embodiment of this disclosure.

FIG. 5 is a schematic diagram of the signal reception apparatus of the embodiment of this disclosure. As shown in FIG. 5, the signal reception apparatus 500 includes:

a transmitting unit 501 configured to transmit configuration information or indication information to a terminal equipment, the configuration information or indication information at least being used by the terminal equipment to determine a first priority of an uplink signal, the first priority being related to content (or service) carried or indicated by the uplink signal; and a receiving unit 502 configured to receive the uplink signal transmitted by the terminal equipment.

It should be noted that the components or modules related to this disclosure are only described above. However, this disclosure is not limited thereto, and the signal reception apparatus 500 may further include other components or modules, and reference may be made to related techniques for particulars of these components or modules.

Furthermore, for the sake of simplicity, connection relationships between the components or modules or signal profiles thereof are only illustrated in FIG. 5. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the signal has a first priority in the physical layer, the first priority corresponds to the content carried or indicated by the signal. Hence, the physical layer is able to distinguish the priority of the content carried or indicated by the signal, thereby resolving conflicts between signals carrying or indicating services of different priorities.

Embodiments of a Seventh Aspect

The embodiments of this disclosure provide a communication system, and reference may be made to FIG. 1, with contents identical to those in the embodiments of the first to the sixth aspect being not going to be described herein any further.

In some embodiments, the communication system 100 may include:

a terminal equipment 102 configured to determine that a time-frequency resource of a first uplink signal (or channel) at least partially overlaps a time-frequency resource of a second uplink signal (or channel) on a time domain or a time-frequency domain, compare the first uplink signal and the second uplink signal, the comparison at least comprising comparing a first priority of the first uplink signal and a first priority of the second uplink signal, and the first priority being related to content (or service) carried or indicated by an uplink signal, and transmit the first uplink signal and/or the second uplink signal to a network device; and the network device 101 configured to receive the first uplink signal and/or the second uplink signal.

The embodiment of this disclosure further provides a network device, which may be, for example, a base station. However, this disclosure is not limited thereto, and it may also be another network device.

Figure 6:
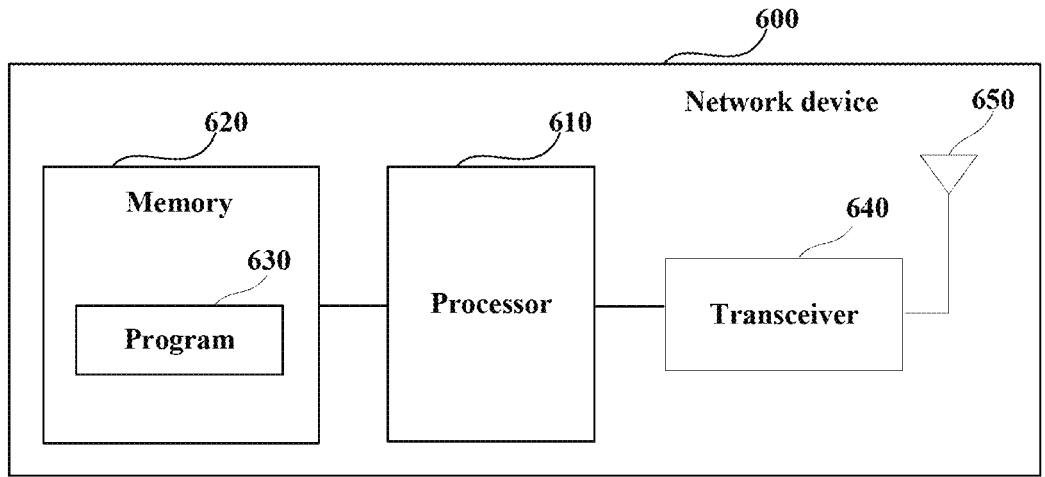
FIG. 6 is a schematic diagram of the network device of an embodiment of this disclosure.

FIG. 6 is a schematic diagram of the network device of the embodiment of this disclosure. As shown in FIG. 6, the network device 600 may include a processor 610 (such as a central processing unit (CPU)) and a memory 620, the memory 620 being coupled to the processor 610. The memory 620 may store various data, and furthermore, it may store a program 630 for data processing, and execute the program 630 under control of the processor 610.

For example, the processor 610 may be configured to execute the program to carry out the signal reception method as described in the embodiments of the fourth aspect. For example, the processor 610 may be configured to execute the following control: transmitting configuration information or indication information to a terminal equipment, the configuration information or the indication information being at least used by the terminal equipment to determine a first priority of an uplink signal, the first priority being related to content (or service) carried or indicated by the uplink signal; and receiving the uplink signal transmitted by the terminal equipment.

Furthermore, as shown in FIG. 6, the network device 600 may include a transceiver 640, and an antenna 650, etc. Functions of the above components are similar to those in the relevant art, and shall not be described herein any further. It should be noted that the network device 600 does not necessarily include all the parts shown in FIG. 6, and furthermore, the network device 600 may include parts not shown in FIG. 6, and the relevant art may be referred to.

The embodiment of this disclosure further provides a terminal equipment; however, this disclosure is not limited thereto, and it may also be another equipment.

FIG. 7 is a schematic diagram of the terminal equipment of the embodiment of this disclosure. As shown in FIG. 7, the terminal equipment 700 may include a processor 710 and a memory 720, the memory 720 storing data and a program and being coupled to the processor 710. It should be noted that this figure is illustrative only, and other types of structures may also be used, so as to supplement or replace this structure and achieve a telecommunications function or other functions.

For example, the processor 710 may be configured to execute a program to carry out the signal transmission method as described in the embodiments of the first aspect. For example, the processor 710 may be configured to perform the following control: determining that a time-frequency resource of a first uplink signal (or channel) and a time-frequency resource of a second uplink signal (or channel) at least partially overlap in a time domain or a time-frequency domain; comparing the first uplink signal and the second uplink signal, the comparing at least comprising comparing a first priority of the first uplink signal and a first priority of the second uplink signal, the first priority being related to content (or service) carried or indicated by an uplink signal; and transmitting the first uplink signal and/or the second uplink signal to a network device.

As shown in FIG. 7, the terminal equipment 700 may further include a communication module 730, an input unit 740, a display 750, and a power supply 760; wherein functions of the above components are similar to those in the relevant art, which shall not be described herein any further. It should be noted that the terminal equipment 700 does not necessarily include all the parts shown in FIG. 7, and the above components are not necessary. Furthermore, the terminal equipment 700 may include parts not shown in FIG. 7, and the relevant art may be referred to.

An embodiment of this disclosure provides a computer program, which, when executed in a terminal equipment, will cause the terminal equipment to carry out the signal transmission method as described in the embodiments of the first aspect.

An embodiment of this disclosure provides a storing medium, including a computer program, which will cause a terminal equipment to carry out the signal transmission method as described in the embodiments of the first aspect.

An embodiment of this disclosure provides a computer program, which, when executed in a network device, will cause the network device to carry out the signal reception method as described in the embodiments of the fourth aspect.

An embodiment of this disclosure provides a storing medium, including a computer program, which will cause a network device to carry out the signal reception method as described in the embodiments of the fourth aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

As to implementations containing the above embodiments, following supplements are further disclosed.

1. A signal transmission method, comprising:

determining by a terminal equipment that a time-frequency resource of a first uplink signal (or channel) and a time-frequency resource of a second uplink signal (or channel) at least partially overlap in a time domain or a time-frequency domain;

comparing the first uplink signal and the second uplink signal by the terminal equipment, the comparison at least comprising comparing a first priority of the first uplink signal and a first priority of the second uplink signal, the first priority being related to content (or service) carried or indicated by an uplink signal; and transmitting the first uplink signal and/or the second uplink signal by the terminal equipment to a network device.

2. The method according to supplement 1, wherein the first priority comprises at least one priority level or priority index to which the content (or service) carried or indicated by the uplink signal correspond.

3. The method according to supplement 1 or 2, wherein the uplink signal comprises feedback information (ACK/NACK) or a feedback information codebook (HARQ-ACK codebook);

a first priority of the feedback information (ACK/NACK) or feedback information codebook (HARQ-ACK codebook) is indicated by the network device.

4. The method according to supplement 3, wherein the first priority is indicated by at least one of following information: a field contained in downlink control information (DCI), a radio network temporary identifier (RNTI) related to downlink control information (DCI), a search space related to downlink control information (DCI), a control resource set (CORESET) related to downlink control information (DCI).

5. The method according to supplement 1 or 2, wherein the uplink signal comprises feedback information (ACK/NACK) or a feedback information codebook (HARQ-ACK codebook);

a first priority of the feedback information (ACK/NACK) or feedback information codebook (HARQ-ACK codebook) being determined according to a priority of a physical downlink shared channel (PDSCH) to which the feedback information (ACK/NACK) or the feedback information codebook (HARQ-ACK codebook) corresponds.

6. The method of according to any one of supplements 1-5, wherein a priority of a physical downlink shared channel (PDSCH) is indicated by the network device by scheduling downlink control information (DCI), or is determined according to a priority of a MAC PDU carried by the PDSCH, or is determined according to a logical channel priority to which data of the MAC PDU carried by the PDSCH correspond.

7. The method according to supplement 6, wherein the physical downlink shared channel (PDSCH) is a semi-persistently scheduled (SPS) PDSCH, and a first priority of feedback information (ACK/NACK) or feedback information codebook (HARQ-ACK codebook) related to the SPS PDSCH is determined at least according to a priority of the SPS PDSCH.

8. The method according to supplement 7, wherein the priority of the SPS PDSCH is indicated by DCI activating the SPS and/or higher layer signaling configuring the SPS.

9. The method according to any one of supplements 1 to 8, wherein the feedback information (ACK/NACK) or feedback information codebook (HARQ-ACK codebook) transmitted by the terminal equipment to the network device is at least used to reflect (or indicate) whether downlink control information (DCI) used to activate and/or release the SPS is correctly received, and/or is at least used to reflect (or indicate) whether downlink control information (DCI) used to activate and/or release an uplink configuration grant (CG) is correctly received.

10. The method according to supplement 9, wherein a priority of the feedback information (ACK/NACK) or the feedback information codebook (HARQ-ACK codebook) related to the DCI used for activating and/or releasing the SPS or the CG is predefined in a standard, or is indicated by the network device to the terminal equipment via the DCI, or is indicated or configured by the network device via higher layer signaling.

11. The method according to supplement 9 or 10, wherein the terminal equipment determines the first priority of the feedback information (ACK/NACK) or the feedback information codebook (HARQ-ACK codebook) related thereto at least according to the priority of the DCI used for activating and/or releasing the SPS or CG.

12. The method according to any one of supplements 9-11, wherein the priority of the DCI used for activating and/or releasing the SPS or CG is predefined in a standard, or is indicated by the network device to the terminal equipment via the DCI, or is indicated or configured by the network device via higher layer signaling.

13. The method according to supplement 1 or 2, wherein the uplink signal comprises channel state information (CSI);

a first priority of the channel state information (CSI) being determined by a threshold of a carried or indicated content (or service), or being determined by a predefined threshold.

14. The method according to supplement 1 or 2, wherein the uplink signal comprises channel state information (CSI);

the channel state information (CSI) being aperiodic CSI, and a first priority of the channel state information (CSI) being indicated by scheduling downlink control information (DCI); or the channel state information (CSI) being periodic CSI, and a first priority of the channel state information (CSI) being configured by higher layer signaling configuring the periodic CSI.

15. The method according to supplement 1 or 2, wherein the uplink signal comprises a physical uplink shared channel (PUSCH), the physical uplink shared channel (PUSCH)

corresponding to a media access control (MAC) protocol data unit (PDU), the MAC PDU comprising at least one MAC CE (control element) and/or data to which at least one logical channel corresponds.

16. The method according to supplement 15, wherein a first priority of the physical uplink shared channel (PUSCH) is indicated by DCI scheduling the PUSCH or is configured by higher layer signaling.

17. The method according to supplement 15, wherein the first priority of the physical uplink shared channel (PUSCH) is determined according to a second priority of a higher layer.

18. The method according to supplement 17, wherein in a case where the MAC PDU to which the physical uplink shared channel (PUSCH) corresponds contains the data to which at least one logical channel corresponds and does not contain the at least one MAC CE, a highest priority in priorities of the at least one logical channel is taken as the first priority of the physical uplink shared channel (PUSCH).

19. The method according to supplement 17, wherein in a case where the MAC PDU to which the physical uplink shared channel (PUSCH) corresponds contains the at least one MAC CE and does not contain the data to which the at least one logical channel corresponds, a highest priority in priorities of the at least one MAC CE is taken as the first priority of the physical uplink shared channel (PUSCH).

20. The method according to supplement 17, wherein in a case where the MAC PDU to which the physical uplink shared channel (PUSCH) corresponds contains the data to which the at least one logical channel corresponds and the at least one MAC CE, a highest priority in priorities of the at least one logical channel is taken as the first priority of the physical uplink shared channel (PUSCH), or a highest priority in priorities of the at least one MAC CE is taken as the first priority of the physical uplink shared channel (PUSCH), or a highest priority in priorities of the at least one MAC CE and the at least one MAC CE is taken as the first priority of the physical uplink shared channel (PUSCH).

21. The method according to any one of supplements 18-20, wherein the priority of the logical channel is designated by a radio resource control (RRC) layer.

22. The method according to any one of supplements 18-20, wherein the priority of the MAC CE is predefined and/or is determined according to the content carried by the MAC CE.

23. The method according to supplement 1 or 2, wherein the uplink signal comprises a scheduling request (SR), a first priority of the scheduling request (SR) is indicated by higher layer signaling.

24. The method according to supplement 23, wherein the first priority of the scheduling request (SR) is determined according to a second priority of the higher layer.

25. The method according to supplement 23, wherein a second priority of a logical channel triggering the scheduling request (SR) is taken as the first priority of the scheduling request (SR).

26. The method according to any one of supplements 17-25, wherein a definition of the first priority of the uplink signal is identical to a definition of the second priority of the higher layer.

27. The method according to any one of supplements 17-25, wherein a definition of the first priority of the uplink signal is at least partially different from the definition of the second priority of the higher layer.

28. The method according to supplement 27, wherein there exists a mapping relationship between the definition of the first priority of the uplink signal and the definition of the second priority of the higher layer.

29. The method according to any one of supplements 1-28, wherein in a case where first priorities of at least two uplink signals are identical, comparison is performed according to types of the at least two uplink signals or types of carried contents.

30. The method according to supplement 29, wherein the first priorities of at least two uplink signals are classified, and comparison is performed respectively on the types of the at least two uplink signals or the types of carried contents according to the classification.

31. The method according to supplement 29 or 30, wherein for different first priorities, results of the comparison performed according to the type of the at least two uplink signals or the types of carried contents are at least partially different.

32. The method according to any one of supplements 1-31, wherein a control signal having a higher priority or carrying/indicating a service/content of a higher priority is able to be multiplexed with a PUSCH of a higher priority.

33. The method according to any one of the supplements 1-31, wherein a control signal having a lower priority or carrying/indicating a service/content of a lower priority is unable to be multiplexed with a PUSCH of a higher priority.

34. The method according to any one of supplements 1-31, wherein a control signal having a higher priority or carrying/indicating a service/content of a higher priority is able to be multiplexed with a PUSCH.

35. The method according to any one of supplements 1-31, wherein a control signal having a lower priority or carrying/indicating a service/content of a lower priority is unable to be multiplexed with a PUSCH.

36. The method according to any one of supplements 1-31, wherein whether control information is able to be multiplexed with PUSCH is at least related to a type of the control information.

37. The method according to supplement 36, wherein control information that is able to be multiplexed with a PUSCH of a high priority is predefined in a standard, or is indicated or configured by the network device for the terminal equipment via higher layer signaling.

38. The method according to any one of supplements 1-31, wherein whether control information is able to be multiplexed with PUSCH is at least related to the number of bits contained in the control information, and/or is related to the first priority of the PUSCH.

39. The method according to any one of supplements 1-38, wherein the first priority comprises at least a first type (level) and a second type (level);

wherein a scheduling request (SR) in the first type (level) is able to be multiplexed with other signals, and a scheduling request (SR) in the second type (level) is unable to be multiplexed with other signals.

40. The method according to any one of supplements 1-38, wherein a scheduling request (SR) is not multiplexed with other signals when the first priority of the scheduling request (SR) is greater than a predetermined threshold, and the scheduling request (SR) is multiplexed with the other signals when the first priority of the scheduling request (SR) is less than or equal to the predetermined threshold.

41. The method according to any one of supplements 1-38, wherein in a case where a first priority of a physical uplink shared channel (PUSCH) is greater than a predetermined threshold, a scheduling request (SR) of less than or equal to P bits is able to be multiplexed with the physical uplink shared channel (PUSCH), and a scheduling request (SR) of more than P bits is unable to be multiplexed with the physical uplink shared channel (PUSCH), P being a positive integer.

42. A data generation method, comprising:

generating an MAC PDU by an MAC layer of a terminal equipment according to a grant;

determining a second priority related to the MAC PDU by the MAC layer of the terminal equipment;

storing the MAC PDU in a HARQ buffer, and instructing a physical layer of the terminal equipment to generate data transmission according to an uplink grant, by the MAC layer of the terminal equipment.

43. The method according to supplement 42, wherein the method further comprises: indicating a second priority related to the MAC PDU to the physical layer of the terminal equipment by the MAC layer of the terminal equipment.

44. A scheduling request generation method, comprising:

triggering a scheduling request (SR) by an MAC layer of a terminal equipment;

determining a third priority related to the SR by the MAC layer of the terminal equipment; and instructing a physical layer of the terminal equipment to signal the SR by the MAC layer of the terminal equipment.

45. The method according to supplement 44, wherein the method further comprises:

indicating a third priority related to the SR to the physical layer of the terminal equipment by the MAC layer of the terminal equipment.

46. The method according to supplement 44 or 45, wherein the third priority related to the SR is a priority of a logical channel related to the SR.

47. The method according to any one of supplements 44-46, wherein the SR is triggered by data arrival on the logical channel to which the SR is related.

48. A scheduling request generation method, comprising:

triggering a scheduling request (SR) by an MAC layer of a terminal equipment;

instructing a physical layer of the terminal equipment to signal the SR by the MAC layer of the terminal equipment; and indicating a priority related to the SR to a physical layer of the terminal equipment by the MAC layer of the terminal equipment.

49. A signal reception method, comprising:

transmitting configuration information or indication information by a network device to a terminal equipment, the configuration information or the indication information being at least used by the terminal equipment to determine a first priority of an uplink signal, the first priority being related to content (or service) carried or indicated by the uplink signal; and receiving, by the network device, the uplink signal transmitted by the terminal equipment.

50. The method according to supplement 49, wherein the first priority comprises at least one priority level or priority index to which a content (or service) carried or indicated by the uplink signal corresponds.

51. The method according to supplement 49 or 50, wherein the uplink signal comprises feedback information (ACK/NACK) or a feedback information codebook (ACK/NACK codebook), a first priority of the feedback information (ACK/NACK) or the feedback information codebook (ACK/NACK codebook) being indicated by the network device.

52. The method according to supplement 51, wherein the first priority is indicated by at least one of following information: a field contained in downlink control information (DCI), a radio network temporary identifier (RNTI) related to downlink control information (DCI), a search space related to downlink control information (DCI), a control resource set (CORESET) related to downlink control information (DCI).

53. The method according to supplement 49 or 50, wherein the uplink signal comprises feedback information (ACK/NACK) or a feedback information codebook (HARQ-ACK codebook);

a first priority of the feedback information (ACK/NACK) or feedback information codebook (HARQ-ACK codebook) being determined according to a priority of a physical downlink shared channel (PDSCH) to which the feedback information (ACK/NACK) or the feedback information codebook (HARQ-ACK codebook) corresponds.

54. The method according to any one of supplements 49-53, wherein a priority of a physical downlink shared channel (PDSCH) is indicated by the network device by scheduling downlink control information (DCI), or is determined according to a priority of a MAC PDU carried by the PDSCH, or is determined according to a logical channel priority to which data of the MAC PDU carried by the PDSCH correspond.

55. The method according to any one of supplements 49-54, wherein a priority of a physical downlink shared channel (PDSCH) is indicated by activating downlink control information (DCI) by the network device, or is configured via higher layer signaling.

56. The method according to supplement 49 or 50, wherein the uplink signal comprises channel state information (CSI);

the channel state information (CSI) being aperiodic CSI, and a first priority of the channel state information (CSI) being indicated by scheduling downlink control information (DCI); or the channel state information (CSI) being periodic CSI, and a first priority of the channel state information (CSI) being configured by higher layer signaling configuring the periodic CSI.

57. The method according to supplement 49 or 50, wherein the uplink signal comprises a physical uplink shared channel (PUSCH), a first priority of the physical uplink shared channel (PUSCH) being indicated by DCI scheduling the PUSCH or being configured by higher layer signaling.

58. The method according to supplement 49 or 50, wherein the uplink signal comprises a scheduling request (SR), a first priority of the scheduling request (SR) being indicated by higher layer signaling.

59. A signal transmission method, comprising:

determining by a terminal equipment that a time-frequency resource of a first uplink signal at least partially overlaps a time-frequency resource of a second uplink signal in a time domain or in a time-frequency domain;

comparing the first uplink signal with the second uplink signal, the comparison at least comprising comparison of a first priority of the first uplink signal with a first priority of the second uplink signal, the first priority being represented by one or more indices, the larger the index of the first priority, the higher the priority; and transmitting the first uplink signal to a network device, wherein the first priority of the first uplink signal is higher than the first priority of the second uplink signal; or transmitting the second uplink signal to the network device, wherein the first priority of the second uplink signal is higher than the first priority of the first uplink signal;

or, transmitting the first uplink signal and the second uplink signal to the network device after being multiplexed, wherein the first priority of the first uplink signal is identical to the first priority of the second uplink signal.

60. The method according to supplement 59, wherein the first priority is a physical layer priority.

61. The method according to supplement 59 or 60, wherein the first priority comprises two indices;

and the first priority is predefined by a standard, or is indicated by the network device to the terminal equipment.

62. The method according to any one of supplements 59-61, wherein the terminal equipment transmits the first uplink signal to the network device, wherein that the first priority of the first uplink signal is higher than the first priority of the second uplink signal comprises: dropping the second uplink signal or terminating ongoing transmission of the second uplink signal, and transmitting the first uplink signal;

or, the terminal equipment transmits the second uplink signal to the network device, wherein that the first priority of the second uplink signal is higher than the first priority of the first uplink signal comprises: dropping the first uplink signal or terminating ongoing transmission of the first uplink signal, and transmitting the second uplink signal.

63. The method according to any one of supplements 59-62, wherein a type of the first uplink signal is identical to a type of the second uplink signal, the type of the first uplink signal or the type of the second uplink signal type comprising feedback information (ACK/NACK);

a first priority of the feedback information being indicated by the network device via a field contained in downlink control information (DCI) used for scheduling a physical downlink shared channel (PDSCH) corresponding to the feedback information.

64. The method according to any one of supplements 59-63, wherein a type of the first uplink signal is identical to a type of the second uplink signal, the type of the first uplink signal or the type of the second uplink signal type comprising feedback information (ACK/NACK) codebook, the feedback information codebook being related to DCI used for releasing a semi-persistent scheduling PDSCH (SPS PDSCH);

a first priority of the feedback information codebook related to the DCI used for releasing the SPS PDSCH being indicated or configured by the network device via high-layer signaling, the high-layer signaling being radio resource control (RRC) signaling and being used by the network device to configure the released SPS PDSCH to the terminal equipment, the feedback information codebook being used to feed back whether the DCI used for releasing a semi-persistent scheduling PDSCH is correctly received.

65. The method according to any one of supplements 59-64, wherein a type of the first uplink signal is identical to a type of the second uplink signal, the type of the first uplink signal or the type of the second uplink signal type comprising sounding reference signal (SRS), a first priority of the SRS being predefined in a communication protocol.

66. The method according to any one of supplements 59-65, wherein a type of the first uplink signal is identical to a type of the second uplink signal, the type of the first uplink signal or the type of the second uplink signal type comprising channel state information (CSI), a first priority of the CSI being indicated by the network device via DCI scheduling CSI report or being predefined in a communication protocol.

67. The method according to any one of supplement 66, wherein the channel state information is aperiodic channel state information, a first priority of the aperiodic channel state information being indicated by the network device via DCI scheduling the aperiodic CSI.

68. The method according to any one of supplements 59-67, wherein a type of the first uplink signal is identical to a type of the second uplink signal, the type of the first uplink signal or the type of the second uplink signal type comprising a physical uplink shared channel (PUSCH), a first priority of the PUSCH being indicated by the network device via DCI scheduling the PUSCH.

69. The method according to any one of supplements 59-68, wherein the first uplink signal or the second uplink signal comprises a configured grant (CG) PUSCH, a first priority of the CG PUSCH being indicated by the network device via high-layer signaling, the high-layer signaling being RRC signaling and being used by the network device to configure the CG PUSCH to the terminal equipment.

70. The method according to any one of supplements 59-69, wherein a type of the first uplink signal is identical to a type of the second uplink signal, the type of the first uplink signal or the type of the second uplink signal type comprising a scheduling request (SR), a first priority of the SR being indicated by the network device via high-layer signaling, the high-layer signaling being RRC signaling and being used by the network device to configure a physical uplink control channel (PUCCH) carrying the SR to the terminal equipment.

71. The method according to any one of supplements 59-61, wherein the terminal equipment transmits the first uplink signal and the second uplink signal to the network device after being multiplexed, wherein the first priority of the first uplink signal is identical to the first priority of the second uplink signal;

a type of the first uplink signal is different from a type of the second uplink signal, the first uplink signal is a high-priority control signal, the second uplink signal is a high-priority PUSCH, and the first uplink signal is multiplexed with the second uplink signal.

72. The method according to any one of supplements 59-61, wherein a type of the first uplink signal is different from a type of the second uplink signal, the first uplink signal is a low-priority control signal, the second uplink signal is a high-priority PUSCH, and the first uplink signal is not multiplexed with the second uplink signal.

73. The method according to supplement 71 or 72, wherein the control signal is feedback information or CSI.

74. The method according to any one of supplements 59-73, wherein an MAC layer of the terminal equipment produces an MAC PDU according to a grant, and determines a second priority related to the MAC PDU.

75. The method according to supplement 74, wherein the number of indices of the first priority is less than the number of indices of the second priority related to the MAC PDU.

76. The method according to supplement 74, wherein the terminal equipment determines the second priority related to the MAC PDU further comprises: determining the second priority according to at least one logical channel to which data contained in the MAC PDU correspond, the MAC PDU containing or not containing an MAC CE.

77. The method according to supplement 76, wherein the terminal equipment determines the second priority according to at least one logical channel to which data contained in the MAC PDU correspond further comprises: determining the second priority according to a highest priority in the priority of at least one logical channel to which data contained in the MAC PDU correspond.

78. The method according to supplement 74, wherein the terminal equipment determines the second priority related to the MAC PDU further comprises: determining that the second priority according to MAC CE contained in the MAC PDU, the MAC PDU does not contain data from a logical channel.

79. The method according to supplement 74, wherein the terminal equipment determines the second priority related to the MAC PDU further comprises: determining that the second priority related to the MAC PDU is a lowest priority, the MAC PDU being used by a physical layer to transmit aperiodic CSI report and containing only padding bits.

80. The method according to supplement 74, wherein the terminal equipment determines a third priority related to SR, the third priority related to SR is a priority triggering a logical channel of the SR.

81. The method according to any one of supplements 59-80, wherein the first priority comprises at least one priority index to which the content carried or indicated by the first uplink signal or the second uplink signal correspond.

82. The method according to any one of supplements 59-81, wherein the terminal equipment compares the first uplink signal and the second uplink signal, the comparison at least comprising comparing a first priority of the first uplink signal and a first priority of the second uplink signal, further comprising:

in a case where an index of a first priority of the first uplink signal and an index of a first priority of the second uplink signal are identical, comparison is performed according to types of the signals or types of carried contents; at least part of priority rules used for comparison according to types of the signals or types of carried contents are different when values of the identical index of the first uplink signal are different.

83. The method according to supplement 82, wherein the types of the signals or types of carried contents at least comprise PUSCH, feedback information (ACK/NACK) and SR; the first priority comprises a first index and a second index;

when a first priority of the first uplink signal and a first priority of the second signal are the first index, the PUSCH takes precedence over the SR and the SR takes precedence over the feedback information, or when a first priority of the first uplink signal and a first priority of the second signal are the second index, the feedback information takes precedence over the PUSCH and the PUSCH takes precedence over the SR.

84. The method according to any one of supplements 59-83, wherein the uplink signals comprise a physical uplink shared channel (PUSCH), the physical uplink shared channel corresponding to a medium access control (MAC) protocol data unit (PDU).

85. A signal reception method, comprising:

receiving, by a network device, a first uplink signal transmitted by a terminal equipment, wherein a first priority of the first uplink signal is higher than a first priority of a second uplink signal; or receiving the second uplink signal transmitted by the terminal equipment, wherein the first priority of the second uplink signal is higher than the first priority of the first uplink signal; or, receiving the first uplink signal and the second uplink signal transmitted by the terminal equipment after being multiplexed, wherein the first priority of the first uplink signal is identical to the first priority of the second uplink signal;

wherein a time-frequency resource of the first uplink signal at least partially overlaps a time-frequency resource of the second uplink signal in a time domain or in a time-frequency domain; the first priority being represented by one or more indices, the larger the index of the first priority, the higher the priority.

86. The method according to supplement 85, wherein the first priority is a physical layer priority.

87. The method according to supplement 85 or 86, wherein the first priority comprises two indices;

and the first priority is predefined by a standard, or is indicated by the network device to the terminal equipment.

88. The method according to any one of supplements 85-87, wherein the terminal equipment drops the second uplink signal or terminates ongoing transmission of the second uplink signal, and transmits the first uplink signal;

or, the terminal equipment drops the first uplink signal or terminates ongoing transmission of the first uplink signal, and transmits the second uplink signal.

89. The method according to any one of supplements 85-88, wherein a type of the first uplink signal is identical to a type of the second uplink signal, the type of the first uplink signal or the type of the second uplink signal type comprising feedback information (ACK/NACK);

a first priority of the feedback information being indicated by the network device via a field contained in downlink control information (DCI) used for scheduling a physical downlink shared channel (PDSCH) corresponding to the feedback information.

90. The method according to any one of supplements 85-89, wherein a type of the first uplink signal is identical to a type of the second uplink signal, the type of the first uplink signal or the type of the second uplink signal type comprising feedback information (ACK/NACK) codebook, the feedback information codebook being related to DCI used for releasing a semi-persistent scheduling PDSCH (SPS PDSCH);

a first priority of the feedback information codebook related to the DCI used for releasing the SPS PDSCH being indicated or configured by the network device via high-layer signaling, the high-layer signaling being radio resource control (RRC) signaling and being used by the network device to configure the released SPS PDSCH to the terminal equipment.

91. The method according to any one of supplements 85-90, wherein a type of the first uplink signal is identical to a type of the second uplink signal, the type of the first uplink signal or the type of the second uplink signal type comprising sounding reference signal (SRS), a first priority of the SRS being predefined in a communication protocol.

92. The method according to any one of supplements 85-91, wherein a type of the first uplink signal is identical to a type of the second uplink signal, the type of the first uplink signal or the type of the second uplink signal type comprising channel state information (CSI), a first priority of the CSI being indicated by the network device via DCI scheduling CSI report or being predefined in a communication protocol.

93. The method according to any one of supplement 92, wherein the channel state information is aperiodic channel state information, a first priority of the aperiodic channel state information being indicated by the network device via DCI scheduling the aperiodic CSI.

94. The method according to any one of supplements 85-93, wherein a type of the first uplink signal is identical to a type of the second uplink signal, the type of the first uplink signal or the type of the second uplink signal type comprising a physical uplink shared channel (PUSCH), a first priority of the PUSCH being indicated by the network device via DCI scheduling the PUSCH.

95. The method according to any one of supplements 85-94, wherein the first uplink signal or the second uplink signal comprises a configured grant (CG) PUSCH, a first priority of the CG PUSCH being indicated by the network device via high-layer signaling, the high-layer signaling being RRC signaling and being used by the network device to configure the CG PUSCH to the terminal equipment.

96. The method according to any one of supplements 85-95, wherein a type of the first uplink signal is identical to a type of the second uplink signal, the type of the first uplink signal or the type of the second uplink signal type comprising a scheduling request (SR), a first priority of the SR being indicated by the network device via high-layer signaling, the high-layer signaling being RRC signaling and being used by the network device to configure a physical uplink control channel (PUCCH) carrying the SR to the terminal equipment.

97. The method according to any one of supplements 85-87, wherein the terminal equipment transmits the first uplink signal and the second uplink signal to the network device after being multiplexed, wherein the first priority of the first uplink signal is identical to the first priority of the second uplink signal;

a type of the first uplink signal is different from a type of the second uplink signal, the first uplink signal is a high-priority control signal, the second uplink signal is a high-priority PUSCH, and the first uplink signal is multiplexed with the second uplink signal.

98. The method according to any one of supplements 85-87, wherein a type of the first uplink signal is different from a type of the second uplink signal, the first uplink signal is a low-priority control signal, the second uplink signal is a high-priority PUSCH, and the first uplink signal is not multiplexed with the second uplink signal.

99. The method according to supplement 97 or 98, wherein the control signal is feedback information or CSI.

100. The method according to any one of supplements 85-99, wherein an MAC layer of the terminal equipment produces an MAC PDU according to a grant, and determines a second priority related to the MAC PDU.

101. The method according to supplement 100, wherein the number of indices of the first priority is less than the number of indices of the second priority related to the MAC PDU.

102. The method according to supplement 100, wherein the second priority related to the MAC PDU is determined according to at least one logical channel to which data contained in the MAC PDU correspond, the MAC PDU containing or not containing an MAC CE.

103. The method according to supplement 102, wherein the second priority related to the MAC PDU is determined according to a highest priority in the priority of at least one logical channel to which data contained in the MAC PDU correspond.

104. The method according to supplement 100, wherein the second priority related to the MAC PDU is determined according to MAC CE contained in the MAC PDU, the MAC PDU does not contain data from a logical channel.

105. The method according to supplement 100, wherein it is determined that the second priority related to the MAC PDU is a lowest priority, the MAC PDU being used by a physical layer to transmit aperiodic CSI report and containing only padding bits.

106. The method according to supplement 100, wherein the terminal equipment determines a third priority related to SR, the third priority related to SR is a priority triggering a logical channel of the SR.

107. The method according to any one of supplements 85-106, wherein the first priority comprises at least one priority index to which the content carried or indicated by the first uplink signal or the second uplink signal correspond.

108. The method according to any one of supplements 85-107, wherein in a case where an index of a first priority of the first uplink signal and an index of a first priority of the second uplink signal are identical, the first uplink signal and the second uplink signal are compared according to types of the signals or types of carried contents; wherein at least part of priority rules used for comparison according to types of the signals or types of carried contents are different when values of the identical index of the first uplink signal are different.

109. The method according to supplement 108, wherein the types of the signals or types of carried contents at least comprise PUSCH, feedback information (ACK/NACK) and SR; the first priority comprises a first index and a second index;

when a first priority of the first uplink signal and a first priority of the second signal are the first index, the PUSCH takes precedence over the SR and the SR takes precedence over the feedback information, or when a first priority of the first uplink signal and a first priority of the second signal are the second index, the feedback information takes precedence over the PUSCH and the PUSCH takes precedence over the SR.

110. The method according to any one of supplements 85-109, wherein the uplink signals comprise a physical uplink shared channel (PUSCH), the physical uplink shared channel corresponding to a medium access control (MAC) protocol data unit (PDU).

111. A terminal equipment, including a memory and a processor, the memory storing a computer program, and the processor being configured to execute the computer program to carry out the method for transmitting an signal as described in any one of supplements 1-41 and 59-84, or carry out the method for generating data as described in any one of supplements 42 or 43, or carry out the method for generating scheduling a request as described in any one of supplements 44-47.

112. A network device, including a memory and a processor, the memory storing a computer program, and the processor being configured to execute the computer program to carry out the method for receiving a signal as described in any one of supplements 49-58 and 85-110.

What is claimed is:
1. A terminal equipment, comprising:
a memory and processor circuitry, the memory storing a program, and the processor circuitry being configured to execute the program to implement:
determining that a time-frequency resource of a first uplink signal at least partially overlaps a time-frequency resource of a second uplink signal in a time domain or in a time-frequency domain;
comparing the first uplink signal with the second uplink signal, the comparison at least comprising comparison of a first priority of the first uplink signal with a first priority of the second uplink signal, the first priority being a physical layer priority and represented by one or more indices, the larger the index of the first priority, the higher the priority; and
transmitting the first uplink signal to a network device, wherein the first priority of the first uplink signal is higher than the first priority of the second uplink signal; or transmitting the second uplink signal to the network device, wherein the first priority of the second uplink signal is higher than the first priority of the first uplink signal;
or, transmitting the first uplink signal and the second uplink signal to the network device after being multiplexed, wherein the first priority of the first uplink signal is identical to the first priority of the second uplink signal.

2. The terminal equipment according to claim 1, wherein the first priority comprises two indices; and
the first priority is predefined by a standard, or is indicated by the network device to the terminal equipment.

3. The terminal equipment according to claim 1, wherein the processor circuitry is configured to execute the program to transmit the first uplink signal to the network device, wherein that the first priority of the first uplink signal is higher than the first priority of the second uplink signal comprises: dropping the second uplink signal or terminating ongoing transmission of the second uplink signal, and transmitting the first uplink signal;
or, the processor circuitry is configured to execute the program to transmit the second uplink signal to the network device, wherein that the first priority of the second uplink signal is higher than the first priority of the first uplink signal comprises: dropping the first uplink signal or terminating ongoing transmission of the first uplink signal, and transmitting the second uplink signal.

4. The terminal equipment according to claim 1, wherein a type of the first uplink signal is identical to a type of the second uplink signal,
the type of the first uplink signal or the type of the second uplink signal type comprising feedback information (ACK/NACK); a first priority of the feedback information being indicated by the network device via a field contained in downlink control information (DCI) used for scheduling a physical downlink shared channel (PDSCH) corresponding to the feedback information;
and/or, the type of the first uplink signal or the type of the second uplink signal type comprising feedback information (ACK/NACK) codebook, the feedback information codebook being related to DCI used for releasing a semi-persistent scheduling PDSCH (SPS PDSCH); a first priority of the feedback information codebook related to the DCI used for releasing the SPS PDSCH being indicated or configured by the network device via high-layer signaling, the high-layer signaling being radio resource control (RRC) signaling and being used by the network device to configure the released SPS PDSCH to the terminal equipment, the feedback information codebook being used to feed back whether the DCI used for releasing a semi-persistent scheduling PDSCH is correctly received;
and/or, the type of the first uplink signal or the type of the second uplink signal type comprising channel state information (CSI), a first priority of the CSI being indicated by the network device via DCI scheduling CSI report or being predefined in a communication protocol;
and/or, the type of the first uplink signal or the type of the second uplink signal type comprising a physical uplink shared channel (PUSCH), a first priority of the PUSCH being indicated by the network device via DCI scheduling the PUSCH;
and/or, the first uplink signal or the second uplink signal comprises a configured grant (CG) PUSCH, a first priority of the CG PUSCH being indicated by the network device via high-layer signaling, the high-layer signaling being RRC signaling and being used by the network device to configure the CG PUSCH to the terminal equipment;

and/or, the type of the first uplink signal or the type of the second uplink signal type comprising a scheduling request (SR), a first priority of the SR being indicated by the network device via high-layer signaling, the high-layer signaling being RRC signaling and being used by the network device to configure a physical uplink control channel (PUCCH) carrying the SR to the terminal equipment.

5. The terminal equipment according to claim 4, wherein the channel state information is aperiodic channel state information, a first priority of the aperiodic channel state information being indicated by the network device via DCI scheduling the aperiodic CSI.

6. The terminal equipment according to claim 2, wherein, a type of the first uplink signal is different from a type of the second uplink signal, the first uplink signal is a high-priority control signal, the second uplink signal is a high-priority PUSCH, and the first uplink signal is multiplexed with the second uplink signal; wherein the control signal is feedback information or CSI;

or, a type of the first uplink signal is different from a type of the second uplink signal, the first uplink signal is a low-priority control signal, the second uplink signal is a high-priority PUSCH, and the first uplink signal is not multiplexed with the second uplink signal.

7. The terminal equipment according to claim 1, wherein the processor circuitry is configured to execute the program so that a MAC layer of the terminal equipment produces a MAC PDU according to a grant, and determines a second priority related to the MAC PDU; wherein the number of indices of the first priority is less than the number of indices of the second priority related to the MAC PDU.

8. The terminal equipment according to claim 7, wherein the processor circuitry is configured to execute the program to determine the second priority related to the MAC PDU further comprises:

determining the second priority according to a highest priority in the priority of at least one logical channel to which data contained in the MAC PDU correspond, the MAC PDU containing or not containing a MAC CE;

and/or, determine that the second priority related to the MAC PDU is a lowest priority, the MAC PDU being used by a physical layer to transmit aperiodic CSI report and containing only padding bits.

9. The terminal equipment according to claim 1, wherein the uplink signals comprise a physical uplink shared channel (PUSCH), the physical uplink shared channel corresponding to a medium access control (MAC) protocol data unit (PDU).

10. A network device, comprising:

a memory and processor circuitry, the memory storing a program, and the processor circuitry being configured to execute the program to implement:

receiving a first uplink signal transmitted by a terminal equipment, wherein a first priority of the first uplink signal is higher than a first priority of a second uplink signal; or receiving the second uplink signal transmitted by the terminal equipment, wherein the first priority of the second uplink signal is higher than the first priority of the first uplink signal; or receiving the first uplink signal and the second uplink signal transmitted by the terminal equipment after being multiplexed, wherein the first priority of the first uplink signal is identical to the first priority of the second uplink signal;

wherein a time-frequency resource of the first uplink signal at least partially overlaps a time-frequency resource of the second uplink signal in a time domain or in a time-frequency domain; the first priority being a physical layer priority and represented by one or more indices, the larger the index of the first priority, the higher the priority.

11. The network device according to claim 10, wherein the first priority comprises two indices; and the first priority is predefined by a standard, or is indicated by the network device to the terminal equipment.

12. The network device according to claim 10, wherein a type of the first uplink signal is identical to a type of the second uplink signal, the type of the first uplink signal or the type of the second uplink signal type comprising feedback information (ACK/NACK); a first priority of the feedback information being indicated by the network device via a field contained in downlink control information (DCI) used for scheduling a physical downlink shared channel (PDSCH) corresponding to the feedback information;

and/or, the type of the first uplink signal or the type of the second uplink signal type comprising feedback information (ACK/NACK) codebook, the feedback information codebook being related to DCI used for releasing a semi-persistent scheduling PDSCH (SPS PDSCH); a first priority of the feedback information codebook related to the DCI used for releasing the SPS PDSCH being indicated or configured by the network device via high-layer signaling, the high-layer signaling being radio resource control (RRC) signaling and being used by the network device to configure the released SPS PDSCH to the terminal equipment;

and/or, the type of the first uplink signal or the type of the second uplink signal type comprising channel state information (CSI), a first priority of the CSI being indicated by the network device via DCI scheduling CSI report or being predefined in a communication protocol;

and/or, the type of the first uplink signal or the type of the second uplink signal type comprising a physical uplink shared channel (PUSCH), a first priority of the PUSCH being indicated by the network device via DCI scheduling the PUSCH;

and/or, the first uplink signal or the second uplink signal comprises a configured grant (CG) PUSCH, a first priority of the CG PUSCH being indicated by the network device via high-layer signaling, the high-layer signaling being RRC signaling and being used by the network device to configure the CG PUSCH to the terminal equipment;

and/or, the type of the first uplink signal or the type of the second uplink signal type comprising a scheduling request (SR), a first priority of the SR being indicated by the network device via high-layer signaling, the high-layer signaling being RRC signaling and being used by the network device to configure a physical uplink control channel (PUCCH) carrying the SR to the terminal equipment.

13. The network device according to claim 12, wherein the channel state information is aperiodic channel state information, a first priority of the aperiodic channel state information being indicated by the network device via DCI scheduling the aperiodic CSI.

14. The network device according to claim 10, wherein the first uplink signal and the second uplink signal are multiplexed, wherein a first priority of the first uplink signal is identical to a first priority of the second uplink signal, and wherein, a type of the first uplink signal is different from a type of the second uplink signal, the first uplink signal is a high-priority control signal, the second uplink signal is a high-priority PUSCH, and the first uplink signal is multiplexed with the second uplink signal.

15. The network device according to claim 10, wherein a MAC layer of the terminal equipment produces a MAC PDU according to a grant, and determines a second priority related to the MAC PDU; wherein the number of indices of the first priority is less than the number of indices of the second priority related to the MAC PDU.

16. The network device according to claim 15, wherein the second priority related to the MAC PDU is determined according to a highest priority in the priority of at least one logical channel to which data contained in the MAC PDU correspond, the MAC PDU containing or not containing a MAC CE;

and/or, it is determined that the second priority related to the MAC PDU is a lowest priority, the MAC PDU being used by a physical layer to transmit aperiodic CSI report and containing only padding bits.

17. The network device according to claim 10, wherein the uplink signals comprise a physical uplink shared channel (PUSCH), the physical uplink shared channel corresponding to a medium access control (MAC) protocol data unit (PDU).

18. A communication system, comprising:
a terminal equipment, configured to determine that a time-frequency resource of a first uplink signal at least partially overlaps a time-frequency resource of a second uplink signal in a time domain or in a time-frequency domain; compare the first uplink signal with the second uplink signal, the comparison at least comprising comparison of a first priority of the first uplink signal with a first priority of the second uplink signal, the first priority being a physical layer priority and represented by one or more indices, the larger the index of the first priority, the higher the priority; and transmit the first uplink signal to a network device, wherein the first priority of the first uplink signal is higher than the first priority of the second uplink signal; or transmit the second uplink signal to the network device, wherein the first priority of the second uplink signal is higher than the first priority of the first uplink signal; or, transmit the first uplink signal and the second uplink signal to the network device after being multiplexed, wherein the first priority of the first uplink signal is identical to the first priority of the second uplink signal; and
a network device, configured to receive a first uplink signal transmitted by the terminal equipment, wherein a first priority of the first uplink signal is higher than a first priority of a second uplink signal; or receive the second uplink signal transmitted by the terminal equipment, wherein the first priority of the second uplink signal is higher than the first priority of the first uplink signal; or receive the first uplink signal and the second uplink signal transmitted by the terminal equipment after being multiplexed, wherein the first priority of the first uplink signal is identical to the first priority of the second uplink signal.

\* \* \* \* \*